US006846437B2

(12) United States Patent
Vandersall et al.

(10) Patent No.: US 6,846,437 B2
(45) Date of Patent: Jan. 25, 2005

(54) AMMONIUM POLYPHOSPHATE SOLUTIONS CONTAINING MULTI-FUNCTIONAL PHOSPHONATE CORROSION INHIBITORS

(75) Inventors: Howard L. Vandersall, Upland, CA (US); Gary H. Kegeler, Diamond Bar, CA (US)

(73) Assignee: Astaris, LLC, St. Louis, MO (US)

( * ) Notice: Subject to any disclaimer, the term of this patent is extended or adjusted under 35 U.S.C. 154(b) by 0 days.

(21) Appl. No.: 10/033,601

(22) Filed: Dec. 26, 2001

(65) Prior Publication Data

US 2003/0066990 A1 Apr. 10, 2003

Related U.S. Application Data

(63) Continuation-in-part of application No. 09/723,567, filed on Nov. 28, 2000.

(51) Int. Cl.$^7$ ............................ C09K 3/00; C09K 21/00; C23F 11/00
(52) U.S. Cl. .................... 252/603; 252/607; 252/389.2; 252/389.53; 252/390
(58) Field of Search ................................ 252/603, 607, 252/389.2, 389.53, 390

(56) References Cited

U.S. PATENT DOCUMENTS

| | | | |
|---|---|---|---|
| 3,007,879 A | 11/1961 | Jordan | |
| 3,196,108 A | 7/1965 | Nelson | |
| 3,214,372 A | 10/1965 | Lobos | |
| 3,223,649 A | 12/1965 | Langguth | |
| 3,245,904 A | 4/1966 | Young | |
| 3,257,316 A | 6/1966 | Langguth et al. | |
| 3,275,566 A | 9/1966 | Langguth | |
| 3,293,189 A | 12/1966 | Morgenthaler | |
| 3,309,324 A | 3/1967 | Langguth et al. | |
| 3,338,829 A | 8/1967 | Langguth et al. | |
| 3,342,749 A | 9/1967 | Handleman et al. | |
| 3,350,305 A | 10/1967 | Langguth et al. | |
| 3,354,084 A | 11/1967 | Katzer | |
| 3,364,149 A | 1/1968 | Morgenthaler | |
| 3,409,550 A | 11/1968 | Gould | |
| 3,625,716 A | 12/1971 | King et al. ................. 106/14 |
| 3,634,234 A | 1/1972 | Morgenthaler | |
| 3,714,066 A | 1/1973 | King et al. ................. 252/389 |
| 3,730,890 A * | 5/1973 | Nelson ......................... 252/7 |
| 3,955,987 A | 5/1976 | Schaar et al. | |
| 3,960,735 A | 6/1976 | Lacey ........................... 252/2 |
| 4,101,485 A | 7/1978 | Brooks et al. | |
| 4,145,296 A | 3/1979 | Fox et al. | |
| 4,168,239 A | 9/1979 | Mertz et al. | |
| 4,194,979 A | 3/1980 | Gottschal | |
| 4,247,435 A * | 1/1981 | Kasten ....................... 523/179 |
| 4,272,414 A | 6/1981 | Vandersall | |
| 4,442,157 A | 4/1984 | Marx et al. | |
| 4,447,336 A | 5/1984 | Vandersall | |
| 4,447,337 A | 5/1984 | Adl et al. | |
| 4,448,841 A | 5/1984 | Glass et al. | |
| 4,459,213 A | 7/1984 | Uchida et al. | |
| 4,588,510 A | 5/1986 | Salyer et al. | |
| 4,606,831 A | 8/1986 | Kegeler et al. | |
| 4,652,383 A | 3/1987 | Tarpley, Jr. et al. | |
| 4,717,509 A | 1/1988 | Buttgens et al. | |
| 4,770,794 A | 9/1988 | Cundasawmy et al. | |
| 4,822,524 A | 4/1989 | Strickland ................... 252/603 |
| 4,839,065 A | 6/1989 | Vandersall ................. 252/603 |
| 4,908,160 A | 3/1990 | Thacker | |
| 4,971,728 A | 11/1990 | Vandersall | |
| 4,978,460 A | 12/1990 | Von Blucher et al. | |
| 4,983,065 A | 1/1991 | Vandersall | |
| 4,983,326 A | 1/1991 | Vandersall | |
| 5,091,097 A | 2/1992 | Pennartz | |
| 5,215,679 A | 6/1993 | Cramm et al. | |

(List continued on next page.)

FOREIGN PATENT DOCUMENTS

| | | | |
|---|---|---|---|
| DE | 3716304 | 11/1988 | |
| DE | 4343728 | 6/1995 | |
| EP | 277932 | 8/1988 | |
| EP | 0693304 A1 | 1/1996 | |
| EP | 0911067 | 4/1999 | ............ A62D/1/00 |
| GB | 2013168 | 8/1979 | |
| GB | 2234501 | 2/1991 | |
| GB | 2301122 | 11/1996 | |
| WO | 93/22000 | 11/1993 | |

OTHER PUBLICATIONS

U.S. Appl. No. 09/723,567, Kegeler et al., filed Nov. 28, 2000.

(List continued on next page.)

Primary Examiner—Cephia D. Toomer
(74) Attorney, Agent, or Firm—Thompson Coburn LLP

(57) ABSTRACT

A corrosion-inhibited fire retardant composition is provided that comprises at least one ammonium polyphosphate, at least one suspending agent, at least one phosphonate selected from a group consisting of aminotri (methylenephosphonic acid), 1-hydroxyethylidene-1,1-diphosphonic acid, hexamethylenediaminetetra (methylenephosphonic acid), diethylenetriaminepenta (methylenephosphonic acid), salts thereof, and mixtures thereof and a corrosion inhibiting system. The corrosion inhibiting system is comprised of at least one corrosion inhibiting compound selected from a group consisting of azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxalate, ferrous oxide, ferric lactate, ferric resinate, and any combination thereof. Methods of making and using the same are also described. In addition, agricultural plant nutrients comprising the same are provided.

78 Claims, No Drawings

U.S. PATENT DOCUMENTS

| | | | |
|---|---|---|---|
| 5,294,664 A | 3/1994 | Morrison, Jr. et al. | |
| 5,788,915 A | 8/1998 | Blount | 252/609 |
| 5,801,116 A | 9/1998 | Cottrell et al. | |
| 5,882,541 A | 3/1999 | Achlmann | |
| 5,958,117 A | 9/1999 | Vandersall | |
| 5,969,011 A | 10/1999 | Frolich et al. | |
| 6,019,176 A * | 2/2000 | Crouch | 169/46 |
| 6,054,515 A | 4/2000 | Blount | 524/118 |
| 6,111,002 A | 8/2000 | Döring et al. | 524/262 |
| 6,124,394 A | 9/2000 | Goto et al. | 524/495 |
| 6,162,375 A | 12/2000 | Crouch et al. | |
| 6,322,726 B1 | 11/2001 | Vandersall et al. | |
| 6,323,263 B1 | 11/2001 | Kuwabawa et al. | |
| 6,676,858 B2 | 12/2001 | Vandersal et al. | |
| 6,447,697 B1 | 9/2002 | Vandersall | |
| 6,517,747 B2 | 2/2003 | Vandersall | |
| 6,620,348 B1 | 9/2003 | Vandersall et al. | |

OTHER PUBLICATIONS

U.S. Appl. No. 09/978,602, Vandersall et al., filed Oct. 16, 2001.

U.S. Appl. No. 10/421,149, Vandersall et al., filed Apr. 23, 2003.

U.S. Appl. No. 10/421,148, Vandersall et al., filed Apr. 23, 2003.

George, C.W., et al., "Evaluation of Megatard 2700 A Proposed New Fire Retardant System", Intermountain Forest and Range Experimental Station, General Technical Report INT–112 (Aug. 1981).

English language abstract of Artsybashev, E.A., et al., Lesnoe Khozyaistvo, No. 12, pp. 43–44 (1991).

English language abstract of Artsybashev, E.S., et al., Lesnoe Khozyaistvo, No. 5, pp. 40–42 (1988).

English language abstract of Lorberbaum, V.G., et al., Lesnoe Khozyaistvo, No. 9, pp. 59–60 (1983).

English language abstract of Shchetinskii, E.A., et al., Lesnoe Khozyaistvo, No. 5, p. 88 (1975).

Abstract of Chemical Week, (Mar. 28, 1979), p. 40.

Derwent Abstract WPI No, 73–76319U of FR 2172867 (1973).

Derwent Abstract WPI No. 95–198325 of RU 2022630 (1995).

Derwent Abstract WPI No. 91–013531 of SU 154451 (1991).

Derwent Abstract WPI No. 91–013530[02] of SU 1544450 (1991).

Derwent Abstract WPI No. 86–055675 of AU 8544579 (1986).

Derwent Abstract WPI No. 80–77100C of BE 883892 (1980).

Patton, Temple C., Pigment Handbook, vol. 1, Properties and Economics, pp. 323–347, date unknown.

Xantham Gum, Natural Biogum For Scientific Water Control, Fifth Edition, Kelco, Division of Merck & Co., Inc., date unknown.

H.L. Vandersall, Air Attack: Retardants, Rheology and Some New Options, Int. J. Wildland Fire 4(1): 45–51, 1994, pp. 45–51.

Database WPI, Derwent Publications, DE 4343728 (Loenhert), Dec. 21, 1993.

USDA Forest Service, entitled Specification For Long Term Retardant, Wildland Fire, Aircraft of Ground Application, Specification 5100–304b (Jan., 2000) Superceding Specification 5100–304b (Jul. 1999) Superceding Specification 5100–304a (Feb. 1986).

Technical Disclosure of physical properties from Day–Glo Color Corp at www.dayglo.com/DOCS/physprop.html (5/95).

USDA Forest Service, entitled Specification For Long Term Retardant, Wildland Fire, Aircraft or Ground Application, Specification 5100–304b (Jan., 2000) Superceding Specification 5100–304b (Jul. 1999) Superceding Specification 5100–304a (Feb. 1986).

Database WPI, Section Ch, Week 197949, Derwent Publications Ltd., London, GB; AN 1979–88266B, XP002212823 & JP 54 138060 A (Nippon Kodoshi Kogyo KK), (Oct. 26, 1979) abstract.

* cited by examiner

AMMONIUM POLYPHOSPHATE SOLUTIONS CONTAINING MULTI-FUNCTIONAL PHOSPHONATE CORROSION INHIBITORS

CROSS-REFERENCE TO RELATED APPLICATIONS

This is a continuation-in-part of U.S. patent application Ser. No. 09/723,567, filed Nov. 28, 2000, which is hereby incorporated by reference in its entirety.

STATEMENT REGARDING FEDERALLY FUNDED RESEARCH OR DEVELOPMENT

Not applicable.

REFERENCE TO MICROFICHE APPENDIX

Not applicable.

FIELD OF THE INVENTION

The present invention relates to ammonium polyphosphate solutions. More specifically, the present invention relates to ammonium polyphosphate solutions containing iron additives and water soluble phosphonates for reduced aluminum corrosion.

BACKGROUND OF THE INVENTION

Aerial application of fire-retardant compositions to combat the spread of wildland fires is common. The composition of fire retardant concentrates designed for managing and controlling wildland fires are of two generally types, those which, when mixed or diluted with water to end-use concentration, result in either a gum thickened solution, and those which do not contain a gum thickener and, consequently, result in water-like solutions, which are not rheologically modified. These water-like retardant solutions exhibit inferior drop characteristics. The former may be supplied as dry powders or as suspensions or slurries, which are generally referred to as fluids. Those concentrates that result in water-like solutions when diluted with water may contain suspended components, as well, but are generally referred to as liquid concentrates. Fire retardant concentrates that are supplied as fluids or liquids are preferred by some because they can be simply and easily diluted to end-use strength with little mixing hardware and manpower.

Fertilizer grade ammonium polyphosphate liquids have been used as aerially applied fire-retardants. These liquids have certain advantages in comparison to other fire-suppressing compositions since they can be transported and stored prior to use in the liquid form rather than being mixed from dry ingredients. However, concentrated liquid fire retardants and solutions prepared therefrom are extremely corrosive to aluminum and brass and mildly corrosive to other materials of construction used in handling, storage and application equipment. As used herein, all metals include alloys thereof. Accordingly, aluminum includes aluminum 2024T3, 6061 and 7074, steel includes 1010 and 4130 steel and brass includes yellow and naval brass. Since wildland fire retardants are most frequently transported to the fire and applied aerially, it is imperative that corrosive damage to the materials of construction of fixed-wing aircraft and helicopters be minimized.

Accordingly, the United States Department of Agriculture ("USDA") Forest Service has established, in "Specification 5100-304b (January 2000) Superseding Specification 5100-00304a (February 1986)," entitled "Specification for Long Term Retardant, Wildland Fire, Aircraft or Ground Application" (hereinafter, "Forest Service Specifications"), hereby incorporated by reference in its entirety, maximum allowable corrosion rates for 2024T3 aluminum, 4130 steel, yellow brass and Az-31-B magnesium. For example, the corrosivity of forest fire retardants, in concentrate, to aluminum, steel and yellow brass must not exceed 5.0 milli-inches ("mils") per year as determined by the "Uniform Corrosion" test set forth in Section 4.3.5.1 of the aforementioned USDA, Forest Service Specifications. If the product is applied from fixed-tank equipped helicopters, the corrosivity of the fire retardants to magnesium must not exceed 5.0 mils per year. The Forest Service Specifications identify the maximum amount of corrosion acceptable when both the retardant concentrate and its diluted solutions are exposed to each metal indicated above at temperatures of 70° Fahrenheit ("F") and 120° F. in both totally and partially immersed configurations. The maximum allowable corrosivity of aerially applied fire retardant diluted solutions to aluminum is 2.0 mils per year ("mpy"), and the maximum corrosivity to brass and steel is 5.0 mpy when partially immersed, and 2.0 mpy when tested in the partially immersed condition. In the partially immersed configuration, one-half of the coupon is within the solution and one-half is exposed to the vapors in the air space over the solution.

In an effort to address the corrosivity problems encountered with the use of fertilizer grade ammonium polyphosphates, sodium ferrocyanide was incorporated into the corrosive compositions. Sodium ferrocyanide has proven to be an effective corrosion inhibitor in fire retardant compositions containing ammonium polyphosphate fertilizer solutions. While sodium ferrocyanide is effective as a corrosion inhibitor, several disadvantages of its use make its incorporation into wildland fire retardant compositions undesirable. Specifically, the environmental and toxicological safety of ferro(i)cyanides is, at best, questionable. When exposed to acidic conditions and/or ultraviolet radiation from natural sunlight, the ferro(i)cyanide radical readily degrades releasing free iron and cyanide and/or hydrogen cyanide, which are toxic to humans, animals and aquatic life. Further, free iron emanating either from decomposition of a portion of the ferro(i)cyanide radical, or introduced from other components or impurities within the composition, will subsequently react with remaining non-decomposed ferro(i) cyanide to form ferrous ferricyanide ("Turnbull's Blue") or ferric ferrocyanide ("Prussian Blue"), which emit a persistent blue-black or indigo-blue coloration, staining all that they contact. Consequently, neither ferricyanide nor ferrocyanide can be used in fire-retardants that are expected to fade and become non-visible over time, for example, in fugitive retardant compositions.

The magnitude of the above concerns is increased since wildland fire retardants are generally applied aerially in a less than completely controlled manner. Due to the presence of variables such as vegetative cover, smoke, or wind drift that impact the trajectory of the free-falling solution, aerially applied wildland fire retardant solutions may land on or near people, animals and in bodies of water, or on soil where it could enter the water supply.

Accordingly, there is a need to provide safe and acceptable wildland fire retardants for the suppression or management of wildland fires that are not corrosive to the equipment associated with the transportation, handling and application of the retardant, have favorable rheological and aerial application characteristics and are environmentally and toxicologically friendly, thereby avoiding the above disadvantages.

SUMMARY OF THE INVENTION

In accordance with the objects of the invention, novel compositions and methods are provided. In a first aspect of the invention, a corrosion-inhibited fire retardant composition comprising at least one fire retardant composition comprised of at least one ammonium polyphosphate, at least one suspending agent, at least one phosphonate selected from a group consisting of aminotri(methylenephosphonic acid), 1-hydroxyethylidene-1,1-diphosphonic acid, hexamethylenediaminetetra(methylenephosphonic acid), diethylenetriaminepenta(methylenephosphonic acid), salts thereof, and mixtures thereof and a corrosion inhibiting system comprised of at least one corrosion inhibiting compound selected from a group consisting of azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxalate, ferrous oxide, ferric lactate, ferric resinate, and any combination thereof. The corrosion inhibiting system is present in a minor amount effective to substantially reduce corrosiveness of said fire retardant composition.

In a second aspect of the invention, a method of preparing a corrosion-inhibited fire retardant composition, adapted for application to wildland fires, is provided that comprises forming an intermediate concentrate composition comprising the above-described corrosion-inhibited fire retardant composition, and diluting the intermediate concentrate with water to form the corrosion-inhibited fire retardant composition of the invention.

In a third aspect of the invention, a method of suppressing wildland fires comprising applying to wildland vegetation a fire suppressing composition comprising the above-described corrosion-inhibited fire retardant composition and water is provided.

In a fourth aspect of the invention, a method of inhibiting corrosion comprising providing a corrodible material, and contacting the corrodible material with the above-described corrosion-inhibited composition is provided.

In a fifth aspect of the invention, a corrosion-inhibited agricultural plant nutrient is provided that comprises at least one agricultural plant nutrient, at least one suspending agent, at least one phosphonate selected from a group consisting of aminotri(methylenephosphonic acid), 1-hydroxyethylidene-1,1-diphosphonic acid, hexamethylenediaminetetra (methylenephosphonic acid), diethylenetriaminepenta (methylenephosphonic acid), salts thereof, and mixtures thereof and a corrosion inhibiting system comprised of at least one corrosion inhibiting compound selected from a group of corrosion inhibiting compounds consisting of azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxalate, ferrous oxide, ferric lactate, ferric resinate, and any combination thereof.

BRIEF DESCRIPTION OF THE DRAWINGS

Not applicable.

DESCRIPTION OF THE PREFERRED EMBODIMENT

In accordance with the present invention, it has been discovered that a fire-retardant composition can be prepared that has a reduced tendency to corrode various metals, including aluminum, that is superior to known fire retardants in rheological aerial application characteristics and is toxicologically and environmentally safe. The corrosion-inhibited fire retardants of the invention include at least one fire retardant composition comprised of at least one ammonium polyphosphate, at least one novel phosphonate, or salt thereof, at least one suspending agent, and a corrosion inhibiting system comprised of at least one corrosion inhibiting compound selected from a group of corrosion inhibiting compounds consisting of azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, insoluble ferric oleate, ferrous fumarate, ferrous oxide, ferric lactate, ferric resinate, and any combination thereof. Generally, the corrosion inhibiting system is present in a minor amount effective to substantially reduce the corrosiveness of the fire retardant composition.

In accordance with the present invention, the corrosion-inhibited fire retardant of the invention includes a fire retardant comprised of at least one ammonium polyphosphate. Ammonium polyphosphate is also referred to as polyammonium phosphate and may include both ortho- and polyphosphate, other ammonium phosphates such as pyro- and metaphosphates, the alkali metal equivalents thereof, as well as a blend of phosphate polymers.

The ammonium polyphosphate solutions that are used as agricultural fertilizer and wildland (vegetative) fire retardants are manufactured by neutralizing aqueous solutions of wet-process phosphoric acid, generally containing about 68% to about 74% phosphorus pentoxide with anhydrous ammonia in such a manner that both high temperature and pressure are experienced. When prepared in this manner, a portion of the impure orthophosphoric acid polymerizes or condenses, resulting in the formation of pyrophosphate, short chain polyphosphates and, in most instances, small amounts of cyclic or metaphosphates. That portion of the acid which does not polymerize, of course, remains as orthophosphoric acid. Ammoniation of this mixture of phosphate species occurs within the reactor, as well, resulting in an aqueous solution containing ammonium ortho, pyro, tripoly, tetrapoly and some higher chain and cyclic phosphate species. These condensed phosphates generally exhibit increased water solubility as compared to orthophosphates and, consequently, more highly concentrated solutions can be prepared when they are present. The relative concentrations of the various species depends primarily on the temperature and pressure achieved within the reactor. Commercial solutions generally contain from about 34% to about 37% phosphorus pentoxide. Phosphorus pentoxide concentrations above about 37% approach water solubility limits resulting in solutions that are not stable, from which solids may precipitate during ambient temperature storage.

Solutions of this type are generally referred to as either 10-34-0 or 11-37-0 liquid concentrates; the numerical designation refers to the percentage of their plant nutrient composition, i.e., ammoniacal nitrogen, phosphorus pentoxide and potassium oxide.

It should be noted that the condensed phosphates which are present in liquid concentrate solutions are subject to hydrolyses which results in de-polymerization. The rate of hydrolytic degradation increases with time, temperature and the relative acidity of the solution. Therefore, ammonium polyphosphate concentrates and their solutions may vary in species composition as received and as time progresses during their subsequent storage.

These liquid concentrates may additionally contain small amounts of diammonium sulfate and a host of metal and alkali-metal impurities. The quantity and quality of these impurities vary with the composition of the phosphate ore, the utilized process and the extent of purification that is conducted during manufacture of the wet-process phosphoric acid. Since these solutions are manufactured primarily as nutrients, the quality control parameters of greatest interest are the percentages of their contained nutrients—nitrogen and phosphorus—and the clarity, stability and color of the solution rather than purity per se.

The corrosion inhibiting system of the invention is comprised of at least one corrosion inhibiting compound selected from a group consisting of azoles, insoluble ferric pyrophosphate, soluble ferric pyrophosphate, ferrous oxalate, ferric citrate, ferrous sulfate, ferric ammonium citrate, ferric orthophosphate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxalate, ferrous oxide, ferric lactate, ferric resinate, and any combination thereof. In one preferred embodiment, the corrosion inhibiting system is comprised of at least one soluble corrosion inhibiting compound and at least one insoluble corrosion inhibiting compound. The combination of such soluble and insoluble corrosion inhibiting iron containing compounds appears to provide the optimum combination of corrosion inhibition.

A minor amount of the corrosion inhibiting system of the invention effective to substantially reduce the corrosiveness of the fire retardant composition is included in the corrosion-inhibited fire retardant composition of the invention. A minor effective amount of the corrosion inhibiting system is that amount which substantially reduces the corrosivity of the fire retardant. As is understood by one of ordinary skill in the art, what constitutes a substantial reduction in corrosivity is largely dependent on the specific fire retardant used in the fire retardant composition of the invention, as well as the specific composition of the corrosion inhibiting system and can be readily determined without undue experimentation.

In one embodiment, the corrosion inhibiting system of the invention is present in a minor amount effective in the corrosion-inhibited fire retardant composition, in concentrate, to obtain at least one of a maximum corrosivity of aluminum to 5.0 mpy, yellow brass to 5.0 mpy, and steel to 5.0 mpy, as determined by the "Uniform Corrosion Test" set forth in Section 4.5.6.1.2 of "Specification 5100-304b (January 2000) Superseding Specification 5100-304a (February 1986)," entitled "Specification For Long Term Retardant, Wildland Fire, Aircraft or Ground Application," issued by the USDA.

In a specific embodiment, the corrosion inhibiting system of the invention comprises in the range of about 0.01% to about 10.0% of the total corrosion-inhibited fire retardant. In another specific embodiment, the corrosion inhibiting system of the invention comprises in the range of about 0.3% to about 6.0% of the total corrosion-inhibited fire retardant. In yet another specific embodiment, the corrosion inhibiting system of the invention comprises in the range of about 0.6% to about 5.0% of the total corrosion-inhibited fire retardant.

It has been discovered that when low concentrations of novel water soluble phosphonates are mixed with neat, ammonium polyphosphate type fire retardants, both in concentrate and its diluted solution, corrosion rates are reduced significantly. Phosphonates, also referred to as phosphonic acids, are multi-functional metal ion control agents. By definition, they contain at least one functional group, $PO_3H_2$, attached to a carbon atom. Phosphonates are generally strongly negatively charged, stable in aqueous systems, high temperature, pressure and Ph extremes, highly soluble in aqueous systems, and compatible with other compounds. Although phosphonates do not readily biodegrade in continuous activated sludge tests, they disappear rapidly in the environment by a combination of photolytic and biological degradation steps. Further, phosphonates appear to possess no acute toxicological properties, which would require special handling that would differ from any strong industrial acid. The novel water soluble phosphonates suitable for use in the present invention include aminotri (methylenephosphonic acid), 1-hydroxyethylidene-1,1-diphosphonic acid, hexamethylenediaminetetra (methylenephosphonic acid), diethylenetriaminepenta (methylenephosphonic acid), and salts thereof. As one skilled in the art should readily recognize, mixtures of these novel phosphonates, and their salts, are suitable for use in the present invention. The phosphonates of the present invention are readily commercially available from Monsanto Chemical Company in St. Louis, Mo., and may also be manufactured by one skilled in the art using known methods.

In a specific embodiment of the invention, aminotri (methylenephosphonic acid), also known as ATMP or AMP, is employed in the present invention. ATMP is represented by the following structure:

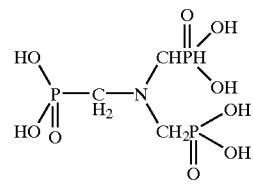

The pentasodium salt of ATMP, also referred to as $Na_5ATMP$, is also suitable for use in the present invention.

In yet another embodiment, 1-hydroxyethyldiene-1,1-diphosphonic acid, also referred to as HEDP, is employed in the present invention. The tetrasodium salt of HEDP, also referred to as $Na_4HEDP$, is also suitable for use in the present invention. HEDP is represented by the following structure:

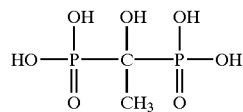

In a further embodiment of the invention, hexamethylenediaminetetra(methylenephosphonic acid), also referred to as HDTMP, is employed in the present invention. The hexapotassium salt of HDTMP, also referred to as $K_6HDTMP$, is also suitable for use in the present invention. HDTMP is represented by the following chemical structure:

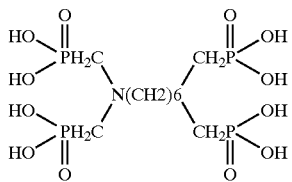

In still a further embodiment of the invention, diethylenetriaminepenta(methylenephosphonic acid), also referred to as DTPMP, is employed. The hexasodium salt thereof, also known as Na$_6$DTPMP is also suitable for use in the present invention. DTPMP is represented by the following chemical structure:

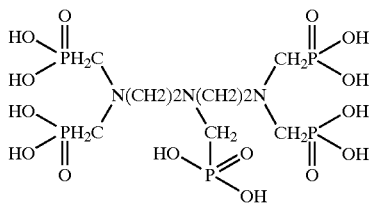

The concentrated fire retardant compositions of the invention are generally comprised of less than about 10% of at least one above-described phosphonate, based on the total ammonium polyphosphate composition, by weight. This is equivalent to about 2.3% active content in the concentrated fire retardant compositions. In one embodiment the concentrated fire retardants of the invention comprise in the range of about 1% to 10% (0.23%–2.3% active), by weight, of at least one above-described phosphonates. In a specific embodiment, the concentrated compositions of the invention are comprised of about 4.35% (1.0% active content), by weight, of at least one above-described phosphonate.

The fire retardant compositions of the invention also contain at least one suspending agent. Suspending agents effectively reduce the rate of separation and settling during long term storage. Thus, as one skilled in the art would appreciate, the amount of suspending agent depends upon its relative effectiveness per unit applied, the desired length of storage, and the additional additives incorporated into the compositions of the invention. Suspending agents useful in the compositions of the invention include colloidal clays, for example, Attapulgus, Fuller's earth, Sepiolite, Montmorillonite, and Kaolin clays. As used herein, Attapulgus clay includes, but is not limited to attapulgite and polygorskite. As used herein, Kaolin clay includes, but is not limited to Kaolinite, [Al$_2$Si$_2$O$_7$-2(H$_2$O)] and [Al$_2$O$_3$-2SiO$_2$-2(H$_2$O)].

As will be apparent to those skilled in the art, the fire retardants of the invention may contain or be mixed with other functional components or additives such as coloring agents, surfactants, stabilizers, opacifying agents, rheological modifying agents, any combination thereof, or with other functional components suitable coloring agents include, but are not limited to both fugitive and non-fugitive coloring agents and pigments, extenders, opacifying pigments, and other highly colored coloring agents. Rheological modifying agents suitable for use include, but are not limited to guar gum, derivatized guar gum and xanthan gum.

For example, and in one embodiment of the invention, the corrosion-inhibited fire retardant composition of the invention includes at least one highly colored pigment. The colored pigment is incorporated to assist in the visual identification of treated and untreated vegetation. Suitable highly colored pigments include iron oxide, which produces many colors like brown and red, titanium dioxide pigments, which produce a white color, or an ultra-violet sensitive dye dispersed in biodegradable plastic. However, for certain uses, like along roadsides or in parks, it may be desirable to exclude colorant from the mixture. Accordingly, as one skilled in the art would appreciate, the amount of colorant or pigment incorporated into the compositions of the invention depends on the degree of dilution and visibility contemplated by the user. Visibility is usually obtained with red iron oxide when it is present in the diluted solution in the range of about 0.15% to about 0.4%, depending on the colorant characteristics and on the vegetative and topographical characteristics of that on which it will be applied. The amount incorporated in the concentrate will, of course, vary with the dilution rate required to provide adequate fire retarding effectiveness.

In another embodiment, the present invention includes at least one of red iron oxide or brown iron oxide, or a combination thereof. In yet another embodiment, the present invention includes a fugitive coloring agent, whose color fades upon exposure to the elements. In a further embodiment, the present invention includes opacifying pigments, which are generally not highly colored, but have the ability to cover and hide that on which it is deposited so that the highly colored pigment becomes more visible.

Surfactants may also be added to increase visibility, through the generation of a foam, and to improve penetration of the retardant solution into porous fuels. Accordingly, as one skilled in the art would appreciate, the amount and type of surfactant incorporated into the compositions of the invention depends on the degree of the dilution and visibility contemplated by the user.

It has been discovered that azoles are effective corrosion inhibitors for brass. In one embodiment of the invention, the compositions of the invention comprise at least one azole. As used herein, an azole is any of a group of chemical compounds with a five-membered ring containing one or more nitrogen atoms. Azoles suitable for use in the corrosion-inhibited fire retardants of the invention include, but are not limited to tolytriazole, benzotriazole, mercaptobenzothiazole, dimercaptothiadiazole, 1,2 benzisothiazoline-3-1,2-benzimidazolone, 4,5,6,7-tetrahydrobenzotriazole, tolylimidazole, 2-(5-ethyl-2-pyridyl) benzimidazole, phthalimide, any alkali metal salts thereof and combinations thereof. The amount of azole or other corrosion inhibitor is dependent upon the corrodible metal for which corrosion resistance is desired, the level of resistance desired, and the specific concentration of the fire retardant composition employed, including corrosion inhibiting compounds contained therein.

The corrosion-inhibited fire retardant compositions of the inventions, adapted for application to wildland fires, are prepared in accordance with the present invention by forming an intermediate concentrate composition comprising the above-described corrosion-inhibited fire retardant compositions of the invention, and diluting the intermediate concentrate with water to form the compositions of the invention adapted for application to wildland fires. The intermediate concentrate is formed by methods well known in the art, for example, by admixing the above-described elements comprising the fire retardant compositions of the invention using manual or mechanical mixing techniques.

To suppress wildland fires, the corrosion-inhibited fire retardant compositions of the invention are diluted with water and applied on threatened vegetation, ahead of approaching wildland fire. Ammonia from both the ammonium phosphate and the ammonium sulfate are liberated at temperatures below the ignition temperature of the fuel. The phosphoric and sulfuric acids are both initially effective fire retarding acids. The phosphoric acid will remain present and effective with the vegetative fuel until temperatures exceed 600° C. However, the boiling point of sulfuric acid is much lower and the amount present will decrease as fuel temperature increases. Thus, at least a portion of the sulfuric acid is still present at the ignition temperature of the fuel. The resultant mineral acids subsequently react with the cellulosic components of vegetative fuels on which they are applied. Their thermal decomposition is thereby altered in such a manner that they will no longer serve as fuel. These reactions are described in U.S. Pat. No. 4,839,065 to Vandersall, which is hereby incorporated by reference in its entirety.

Prior to use, and in one embodiment of the invention, the compositions of the invention are blended with water to form dilute solutions containing the amount of phosphorus pentoxide required to achieve the maximum amount of vegetation coverage at an application rate sufficient to reduce the flammability of the vegetative fuels to the desired level. The water used in the composition of the invention may be tap water or water from other convenient water sources.

In a specific embodiment, the compositions of the invention are blended with water to form dilute solutions containing the amount of phosphorus pentoxide required to meet USDA, Forest Service Specification fire-retardant effectiveness requirements. This concentration, which is determined via combustion-retarding effectiveness testing described in USDA, Forest Service Specification 5100-304b, "4.5.2. Combustion Retarding Effectiveness Test," will generally depend on the percentage of phosphorus pentoxide present in the concentrated composition and the extent of its availability for retarding reactions. The minimum corrosivity rate specified in Specification 5100-304b is generally obtained when the fire retardant concentrate of the invention is diluted with about 1 to about 8 volumes of water.

In one embodiment, the above described fire retardant compositions are used as agricultural plant nutrients. The corrosion inhibiting system is present in a minor effective amount to substantially reduce corrosiveness of the agricultural plant nutrient. As one skilled in the art can appreciate, the effective amount varies depending on the specific plant nutrient formulated. However, one skilled in the art can readily determine the amount without undue experimentation.

A method of inhibiting corrosion using the fire retardant composition of the invention is also provided. According to the method of the invention, a corrodible material is provided and contacted with the fire retardant composition of the invention in an effective amount to substantially reduce the corrosiveness of the corrodible material. Any corrodible material may be used according to the method of inhibiting corrosion of the invention. In one embodiment, the corrodible material is one selected from a group consisting of steel, brass, aluminum and any alloy thereof. Prior to use, and in one embodiment of the invention, the fire retardant compositions of the invention are blended with water prior to or during contact with the corrodible material. The water used may be tap water or water from other convenient water sources.

In one embodiment, the corrosion inhibiting system includes at least one additive selected from a group of additives including coloring agents, surfactants, opacifying pigments, stabilizers, rheological modifying agents, and any combination thereof. Suitable coloring agents include, but are not limited to both fugitive and non-fugitive coloring agents and pigments, extenders, opacifying pigments, and other highly colored coloring agents. Rheological modifying agents suitable for use include, but are not limited to guar gum, derivatized guar gum and xanthan gum.

All references and patents cited herein are hereby incorporated by reference in their entireties for their relevant teachings. Accordingly, any reference cited herein and not specifically incorporated by reference is, nevertheless, incorporated by reference in its entirety as if part of the present specification.

The following examples illustrate specific embodiments of the invention without limiting the scope of the invention in any way. In each example, samples of ammonium polyphosphate fire retardant concentrates were mechanically admixed with iron containing compounds and the phosphonates described, and in some cases, with an azole. Any mechanical mixing technique that is well known in the art may be used in the present invention. The diluted fire retardant solutions are diluted with water, as indicated. The "Requirements" row illustrates the level of aluminum 2024-T3 corrosion allowed by the USDA, Forest Service Specifications 5100-304b, i.e., the maximum allowable corrosivity for product acceptance for use in wildland fire retardant compositions. The resulting samples were tested for corrosivity in accordance with USDA, Forest Service Specifications 5100-304b.

EXAMPLE 1

The Aluminum Corrosivity of Neat Ammonium Polyphosphate Solution

Table 1 illustrates the corrosion characteristics of neat, unadulterated fertilizer grade 10-34-0 and 11-37-0 ammonium polyphosphate liquid concentrates obtained from three different sources. All of the samples are either 10-34-0 or 11-37-0, as received, with no additions. The corrosivity of the samples were expressed in milli-inches per year ("mpy") of metal loss on exposed metal surface based on the conventional USDA, Forest Service Specifications for determining corrosivity. Both the concentrated retardant and its diluted solutions were tested at each temperature and condition indicated.

The diluted solutions were prepared by admixing four to five volumes of water with one volume of the concentrated solution. Thus, the diluted solutions were in the range of between about 15% to about 20% by volume of the concentrate.

In accordance with the Forest Service Specifications for corrosion testing of fire retardants, a one-inch wide, four-inch long, one-eighth inch thick coupon of the aluminum was obtained from a standard source. The coupon is cleaned, dried and weighed according to standard USDA, Forest Service Specification Protocols and suspended in a one quart, straight sided jar filled either 50% (partially) or 100% (totally) using a piece of nylon string. When suspended in a partially full jar, the coupon was 50% (two-inches) immersed in the test solution with the other 50% extending up from the solution into the air space above it. When the jar was full with approximately 800 ml of the solution, the metal coupon was totally immersed in the solution. The jars were then closed with a screw cap and two or three identical corrosion jars (cells) of each partially and totally immersed coupons were stored at 70° F. and 120° F. for ninety days. At the end of the ninety day storage period, the jars were opened and the coupons were removed and cleaned according to the USDA, Forest Service Specifications. After each coupon dried it was re-weighed and its weight loss was determined by comparing its initial and final weights. The calculated weight loss and density of the metal coupon were used to extrapolate to mils (0.001 inches) of aluminum that would be lost during a one-year period at the test condition, assuming that the weight loss was experienced uniformly across the coupon surface. The corrosion rates of both the partially and totally immersed coupons were calculated using the total surface area of the coupon. The samples at each condition were then averaged and reported as the corrosion rate. The results are shown in Table 1.

TABLE 1

| | Aluminum Corrosivity when tested in the indicated configuration (mpy) | | | | | | | |
|---|---|---|---|---|---|---|---|---|
| | Neat Concentrate | | | | Diluted Solution | | | |
| Ammonium Polyphosphate Samples | 70° F. total | 70° F. partial | 120° F. total | 120° F. partial | 70° F. total | 70° F. partial | 120° total | 120° partial |
| Requirements | ≦5.0 | ≦5.0 | ≦5.0 | ≦5.0 | ≦2.0 | ≦2.0 | ≦2.0 | ≦2.0 |
| Sample 1 | 8.7 | 4.3 | 134.3 | 77.8 | 8.4 | 6.5 | 24.9 | 5.7 |
| Sample 2 | 12.4 | 6.6 | 106.6 | 78.5 | 15.2 | 8.4 | 10.1 | 5.6 |
| Sample 3 | | | 146.0 | | | | 5.8 | |
| Sample 4 | 8.1 | 4.1 | 140.7 | 67.4 | 5.8 | 6.3 | 11.4 | 7.8 |
| Sample 5 | | | 129.4 | | | | 11.0 | |
| Sample 6 | | | 170.0 | | | | 10.8 | |
| Sample 7 | | | 168.5 | | | | 7.4 | |
| Sample 8 | 10.2 | 5.3 | 165.0 | 88.6 | 12.3 | 6.4 | 21.8 | 13.3 |
| Sample 9 | 10.9 | 5.5 | 161.4 | 85.3 | 12.0 | 7.0 | 39.0 | 14.8 |
| Sample 10 | | | 130.0 | | | | 21.1 | |
| Sample 11 | | | 126.2 | | | | 22.8 | |
| Sample 12 | 4.3 | | 109.4 | | 11.0 | | 6.4 | |
| Sample 13 | | | 149.4 | | | | 33.7 | |
| Sample 14 | 9.5 | | 155.6 | | 12.7 | | 35.8 | |
| Sample 15 | 12.7 | 6.0 | 201.0 | 96.5 | 12.8 | 7.5 | 35.8 | 19.3 |
| Sample 16 | 13.1 | 7.1 | 159.0 | 86.7 | 11.2 | 6.5 | 42.7 | 21.8 |
| Sample 17 | | | 151.5 | | | | 13.3 | |
| Sample 18 | | | 136.3 | | | | 29.2 | |
| Sample 19 | 12.0 | 6.3 | 144.8 | 94.5 | 17.7 | 10.4 | 10.5 | 7.0 |
| Sample 20 | 9.9 | | 115.8 | | 13.8 | | 12.4 | |
| Sample 21 | 15.2 | | 176.9 | | 12.7 | | 35.1 | |
| Sample 22 | 10.9 | 5.5 | 172.6 | 74.8 | 13.1 | 7.2 | 42.9 | 18.3 |
| Average | 10.6 | 5.6 | 147.7 | 83.3 | 12.2 | 7.4 | 22.0 | 12.6 |
| Range (Lo–Hi) | 4.3–15.2 | 4.1–7.1 | 106.6–201.0 | 67.4–94.5 | 5.8–17.7 | 6.3–10.4 | 5.8–42.9 | 5.6–21.8 |

The corrosivity of the ammonium polyphosphate solutions to aluminum 2024T-3 was relatively low when the temperature was maintained at about 70° F. However, none of the samples of the neat ammonium polyphosphate solutions met the Forest Service Specifications for corrosivity of fire retardants. In addition, the results show that increasing the solution temperature to 120° F. dramatically increases the corrosion of the aluminum coupon by the neat ammonium polyphosphate samples, i.e., in excess of an order of magnitude.

EXAMPLE 2

The Aluminum Corrosivity of Ammonium Polyphosphate Solution Containing Iron Oxide & Attapulgus Clay The corrosion characteristics of neat fertilizer grade ammonium polyphosphate solutions containing additional amounts (<3%) of a mixture of an iron oxide colorant and Attapulgus clay is illustrated in Table 2. Each sample was prepared by admixing neat concentrated ammonium polyphosphate obtained from several sources with Attapulgus clay, and either 1.2% red iron oxide or 1.2% brown iron oxide, as indicated. In addition, 0.3% tolytriazole was also admixed into samples 11, 15, 16, 18 and 19 and 0.5% tolytriazole was admixed into sample 20. Aliquots from these concentrate samples were then diluted by admixing 1.0 volume of concentrate with 4.25 volumes of tap water. The concentrates and their solutions were then tested for corrosivity and diluted in accordance with Forest Service Specifications. The results are shown in Table 2.

TABLE 2

| | | Corrosion Rate (milli-inches per year) | | | | | | | |
|---|---|---|---|---|---|---|---|---|---|
| | | Neat Concentrate | | | | Diluted Solution | | | |
| Ammonium Polyphosphate Samples | Type of Iron Oxide | 70° F. total | 70° F. partial | 120° F. total | 120° F. partial | 70° F. total | 70° F. partial | 120° F. total | 120° F. partial |
| Corrosion of neat 10-34-0 Average from Table 1 | none | 10.6 | 5.6 | 147.7 | 83.3 | 12.2 | 7.4 | 22.0 | 12.6 |
| Requirements | | ≦5.0 | ≦5.0 | ≦5.0 | ≦5.0 | ≦2.0 | ≦2.0 | ≦2.0 | ≦2.0 |
| Sample 1 | Bn Iron oxide[1] | | | 1.4 | | | | 4.4 | |
| Sample 2 | Bn Iron oxide[1] | | | 0.7 | | | | 3.7 | |
| Sample 3 | Bn Iron oxide[1] | | | 1.4 | | | | 2.3 | |
| Sample 4 | Bn Iron oxide[1] | | | 6.4 | | | | 10.1 | |
| Sample 5 | Rd Iron oxide[2] | 4.6 | 3.6 | 7.3 | 5.0 | 6.7 | 4.4 | 4.0 | 3.6 |
| Sample 6 | Rd Iron oxide[2] | 3.5 | 1.9 | 6.7 | 9.0 | 4.3 | 3.9 | 2.5 | 3.3 |
| Sample 7 | Rd Iron oxide[2] | | | 2.3 | | | | 4.5 | |

TABLE 2-continued

| | | Corrosion Rate (milli-inches per year) | | | | | | | |
| | | Neat Concentrate | | | | Diluted Solution | | | |
| Ammonium Polyphosphate Samples | Type of Iron Oxide | 70° F. total | 70° F. partial | 120° F. total | 120° F. partial | 70° F. total | 70° F. partial | 120° F. total | 120° F. partial |
|---|---|---|---|---|---|---|---|---|---|
| Sample 8 | Rd Iron oxide[(2)] | 3.5 | 3.8 | 1.7 | 1.6 | 2.8 | 4.3 | 3.5 | 3.6 |
| Sample 9 | Rd Iron oxide[(2)] | | | 3.0 | | | | 3.1 | |
| Sample 10 | Rd Iron oxide[(2)] | | | 15.3 | | | | 11.7 | |
| Sample 11 | Rd Iron oxide[(2)] | | | 32.1 | | | | 7.1 | |
| Sample 12 | Rd Iron oxide[(2)] | | | 8.3 | | | | 3.8 | |
| Sample 13 | Rd Iron oxide[(2)] | | | 26.3 | | | | 3.9 | |
| Sample 14 | Rd Iron oxide[(2)] | | | 19.7 | | | | 3.8 | |
| Sample 15 | Rd Iron oxide[(2)] | | | 4.3 | | | | 0.8 | |
| Sample 16 | Rd Iron oxide[(2)] | | | 6.7 | | | | 5.3 | |
| Sample 17 | Rd Iron oxide[(2)] | | | 2.3 | | | | 4.2 | |
| Sample 18 | Rd Iron oxide[(2)] | 1.4 | | 8.0 | | 2.7 | | 2.0 | |
| Sample 19 | Rd Iron oxide[(2)] | 5.0 | 3.5 | 8.5 | 13.7 | 5.7 | 4.2 | 5.4 | 4.1 |
| Sample 20 | Rd Iron oxide[(2)] | 4.4 | 2.4 | 11.2 | 2.8 | 4.1 | 4.0 | 2.3 | 2.8 |
| Sample 21 | Rd Iron oxide[(2)] | | | 2.0 | | | | 1.9 | |
| Sample 22 | Rd Iron oxide[(2)] | | | 7.8 | | | | 11.1 | |
| Average | | 3.7 | 3.0 | 8.3 | 6.4 | 4.4 | 4.2 | 4.6 | 3.5 |
| Range | | 1.4–5.0 | 1.9–3.8 | 0.7–32.1 | 1.6–13.7 | 2.7–5.7 | 3.9–4.3 | 2.5–11.7 | 2.8–4.1 |

[(1)]Brown iron oxide, Lot number 5594050A, Elementis Pigments No. 8690.
[(2)]Red iron oxide, Lot number 5891719A, Elementis Pigments R03097 precipitated Kroma red pigment The results indicate that the addition of small amounts of iron oxide and clay reduce the corrosion of totally immersed aluminum in a 70° F. solution by 50% to 65%. In addition, the impact of the mixture on high temperature corrosion is even more dramatic than at low temperatures. When the corrosion cell was stored at 120° F., the rate of aluminum corrosion decreased by about 75% to 90%. At both temperatures the corrosion rate on partially immersed coupons was greater than 50% of the totally immersed values, which indicated that significant interface or vapor/air phase corrosion occurs when the mixture is present in the solution. This differs from the corrosivity of the neat ammonium polyphosphate solutions of Table 1. However, the addition of 1.2% insoluble iron oxide and a clay to the ammonium polyphosphate samples did not reduce the aluminum 2024-T3 corrosion rate of the concentrates or its solutions to within the limits required by the USDA, Forest Service Specifications.

EXAMPLE 3

The Aluminum Corrosivity of Ammonium Polyphosphate Solutions Containing a Mixture of Soluble and Insoluble Iron Compounds The data in Tables 3a and 3b illustrate the relative effectiveness of a number of corrosion inhibitor systems containing water soluble and water insoluble sources of iron, and mixtures thereof, in several sources and types of ammonium polyphosphate concentrates and their diluted solutions. The samples were prepared by admixing either 10-34-0 or 11-37-0 type ammonium polyphosphate solutions from various sources with varying concentrations of insoluble red iron oxide or brown iron oxide additives and Attapulgus clay additives and varying the concentrations of other iron containing additives, as indicated. Samples 1, 2, 3 and 4 are 10-34-0 ammonium polyphosphate concentrates from different sources. The solutions were subjected to high shear mixing in order to activate or hydrate the clay.

Each concentrate and its diluted solution was tested for aluminum corrosivity in accordance with the Forest Service Specification protocols. The results are shown in Tables 3a and 3b.

TABLE 3a

| | Ammonium Polyphosphate Sample | Insoluble Iron Oxide Added | | Other Iron Containing Additive | | Fe. Content | | Corrosion (mpy) | | | | | | | |
| | | | | | | | | Neat Concentrate | | | | Diluted Solution | | | |
| | | % Type | (%) | Additive | | % insol. | % sol | 70° F. Total | 70° F. partial | 120° F. total | 120° F. Partial | 70° F. total | 70° F. partial | 120° F. total | 120° F. partial |
|---|---|---|---|---|---|---|---|---|---|---|---|---|---|---|---|
| 1 | SAMPLE 1 (See Table 1) | 0.0 None | 0.0 | None | | 0.00 | 0.00 | 9.1 | 5.2 | 140.6 | 79.5 | 10.8 | 6.9 | 16 | 9.4 |
| 2 | | 1.2 Iron oxide | 0.0 | None | | 0.00 | 0.00 | 3.7 | 3 | 8.3 | 6.4 | 4.4 | 4.2 | 4.6 | 3.5 |
| 3 | | 0.6 Br. Iron oxide | 3.0 | Sol. Ferric pyrophosphate | | 0.42 | 0.35 | | | 7.4 | | | | 0.5 | |
| 4 | | 0.6 Br Iron oxide | 5.0 | Sol. Ferric pyrophosphate | | 0.42 | 0.58 | | | 9.0 | | | | 0.6 | |

TABLE 3a-continued

| | Ammonium Polyphosphate Sample | Insoluble Iron Oxide Added % | Type | Other Iron Containing Additive (%) | Additive | Fe. Content % insol. | % sol | Neat Concentrate 70° F. Total | 70° F. partial | 120° F. total | 120° F. Partial | Diluted Solution 70° F. total | 70° F. partial | 120° F. total | 120° F. partial |
|---|---|---|---|---|---|---|---|---|---|---|---|---|---|---|---|
| 5 | | 1.2 | Br. Iron oxide | 3.0 | Sol Ferric pyrophosphate | 0.84 | 0.35 | | | 2.2 | | | | 1.0 | |
| 6 | | 1.2 | Br. Iron oxide | 3.0 | Sol. Ferric pyrophosphate | 0.84 | 0.35 | | | 2.2 | | | | 1.0 | |
| 7 | | 1.2 | Red Iron oxide | 3.0 | Sol Ferric pyrophosphate | 0.84 | 0.35 | | | 5.7 | | | | 1.3 | |
| 8 | | 1.2 | Red Iron oxide | 3.0 | Sol. Ferric pyrophosphate | 0.84 | 0.35 | | | 10.9 | | | | 2.5 | |
| 9 | | 1.2 | Red Iron oxide | 3.0 | Sol. Ferric pyrophosphate | 0.84 | 0.35 | | | 10.8 | | | | 1.6 | |
| 10 | | 1.2 | Red Iron oxide | 3.0 | Sol. Ferric pyrophosphate | 0.84 | 0.35 | | | 10.3 | | | | 1.5 | |
| 11 | | 1.2 | Red Iron oxide | 3.0 | Sol. Ferric pyrophosphate* | 0.84 | 0.35 | | | 18.1 | | | | 1.6 | |
| 12 | | 1.2 | Red Iron oxide | 3.0 | Sol. Ferric pyrophosphate* | 0.84 | 0.35 | 3.1 | 3.1 | 6.1 | 2.9 | 4.4 | 3.6 | 1.6 | 3.4 |
| 13 | | 0.6 | Br. Iron oxide | 0.6 | Sol. Ferric citrate* | 0.42 | 0.13 | | | 118.7 | | | | 1.4 | |
| 14 | | 0.6 | Br Iron oxide | 3.0 | Sol. Ferric citrate | 0.42 | 0.66 | | | 5.5 | | | | 0.6 | |
| 15 | | 0.6 | Br Iron oxide | 3.0 | Sol. Ferric citrate* | 0.42 | 0.66 | | | 6.7 | | | | 0.6 | |
| 16 | | 1.2 | Br. Iron oxide | 1.8 | Sol. Ferric citrate* | 0.84 | 0.40 | | | 0.9 | | | | 0.5 | |
| 17 | | 1.2 | Br. Iron oxide | 1.8 | Sol. Ferric citrate* | 0.84 | 0.40 | | | 15.3 | | | | 3.3 | |
| 18 | | 1.2 | Red Iron oxide | 1.8 | Sol. Ferric citrate* | 0.84 | 0.40 | | | 46.5 | | | | 2.2 | |
| 19 | | 1.2 | Br. Iron oxide | 3.0 | Sol. Ferric citrate* | 0.84 | 0.66 | | | 1.0 | | | | 0.7 | |
| 20 | | 1.2 | Br. Iron oxide | 3.0 | Sol. Ferric citrate | 0.84 | 0.66 | | | 4.5 | | | | 0.7 | |
| 21 | | 1.2 | Br. Iron oxide | 3.0 | Sol. Ferric citrate | 0.84 | 0.66 | | | 3.9 | | | | 0.6 | |
| 22 | | 1.2 | Br. Iron oxide | 3.0 | Sol. Ferric citrate | 0.84 | 0.66 | | | 1.0 | | | | 0.7 | |
| 23 | | 0.6 | Br. Iron oxide | 5.0 | Sol. Ferric NH4 citrate | 0.42 | 0.88 | | | 7.9 | | | | 0.8 | |
| 24 | | 1.2 | Red Iron oxide | 1.8 | Sol. Ferric NH4 citrate | 0.84 | 0.32 | | | 53.9 | | | | 3.4 | |
| 25 | | 1.2 | Red Iron oxide | 3.0 | Sol. Ferrous sulfate · 7H2O | 0.84 | 0.60 | | | 1.0 | | | | 3.4 | |
| 26 | | 1.2 | Red Iron oxide | 1.2/3.0 | Insol/sol. Ferric pyrophosphate | 1.13 | 0.35 | | | 7.5 | | | | 1.3 | |
| 27 | | | | 1.2/3.0 | Insol./sol. Ferric pyrophosphate | 0.29 | 0.35 | | | 2.0 | | | | 1.2 | |
| 28 | | | | 1.2/3.0 | Insol./sol Ferric pyrophosphate | 0.29 | 0.35 | | | 2.3 | | | | 0.7 | |
| 29 | | | | 3.0/3.0 | Insol/sol. Ferric pyrophosphate | 0.72 | 0.35 | | | 5.8 | | | | 1.0 | |
| 30 | | | | 1.2/3.0 | Insol ferric pyro/sol Fe citrate | 0.29 | 0.66 | | | 2.1 | | | | 1.2 | |

*These compositions contain 0.3–0.5% tolytriazole for brass corrosion inhibition TABLE 3b

| | Ammonium Polyphosphate Sample | Insoluble Iron Oxide Added % Type | Other Iron Containing Additive (%) | Other Iron Containing Additive Additive | Fe. Content % insol. | Fe. Content % sol | Neat Concentrate 70° F. total | Neat Concentrate 70° F. partial | Neat Concentrate 120° F. total | Neat Concentrate 120° F. partial | Diluted Solution 70° F. total | Diluted Solution 70° F. partial | Diluted Solution 120° F. total | Diluted Solution 120° F. partial |
|---|---|---|---|---|---|---|---|---|---|---|---|---|---|---|
| 31 | SAMPLE 1 | | 1.2/3.0 | Insol ferric ortho/sol. Ferric pyro | 0.37 | 0.35 | | | 3.1 | | | | 1.5 | |
| 32 | | | 1.2/3.0 | Insol ferric ortho/sol Ferric pyro | 0.37 | 0.35 | | | 2.2 | | | | 1.0 | |
| 33 | | | 1.2/3.0 | Insol/sol Ferric ortho | 0.37 | 0.41 | | | 1.9 | | | | 2.2 | |
| 34 | | | 1.2/3.0 | Insol/sol. Ferric ortho | 0.37 | 0.41 | | | 1.9 | | | | 1.5 | |
| 35 | | | 1.2/4.0 | Insol. Fe(III) orthophosphate/sol Fe(III) NH4 citrate | 0.37 | 0.70 | | | 2.3 | | | | 1.4 | |
| 36 | | | 1.2/4.0 | Insol. Fe(III) orthophosphate/sol Fe(III) NH$_4$ citrate | 0.37 | 0.70 | | | 1.8 | | | | 1.2 | |
| 37 | | | 1.2/3.0 | Insol. Fe oxalate 2H$_2$0/sol Ferric pyrophosphate | 0.37 | 0.35 | | | 17.0 | | | | 1.9 | |
| 38 | | | 1.2/3.0 | Insol. Fe oxalate/sol Fe sulfate | 0.37 | 0.60 | | | 37.4 | | | | 5.8 | |
| 39 | SAMPLE 2 | 1.2 Red Iron oxide | 3.0 | Sol. Ferric pyrophosphate | 0.84 | 0.35 | 1.2 | 0.9 | 10.1 | 5.2 | 3.7 | 3.7 | 1.4 | 1.7 |
| 40 | | 1.2 Br. Iron oxide | 3.0 | Sol. Ferric citrate | 0.84 | 0.66 | | | 0.2 | | | | 0.4 | |
| 41 | SAMPLE 3 | 0.6 Br. Iron oxide | 5.0 | Sol. Ferric citrate | 0.42 | 1.10 | | | 6.2 | | | | 0.5 | |
| 42 | | 1.2 Br. Iron oxide | 3.0 | Sol. Ferric pyrophosphate | 0.84 | 0.45 | 2.8 | 2.7 | 110.1 | 70.2 | 11.0 | 6.7 | 7.6 | 3.5 |
| 43 | | 1.2 Red Iron oxide | 3.0 | Sol. Ferric pyrophosphate | 0.84 | 0.35 | | | 33.2 | | | | 7.6 | |
| 44 | SAMPLE 4 | 1.2 Red Iron oxide | 3.0 | Sol. Ferric pyrophosphate | 0.84 | 0.35 | 3.7 | | 76.5 | | 6.4 | | 0.8 | |
| 45 | SAMPLE 5[2] | 1.2 Red Iron oxide | 3.0 | Sol. Ferric pyrophosphate | 0.84 | 0.35 | 2.3 | | 2.8 | | 2.8 | | 1.1 | |
| 46 | | 1.2 Red Iron oxide | 4.0 | Sol. Ferric pyrophosphate | 0.84 | 0.46 | 1.8 | | 2.8 | | 2.6 | | 1.8 | |
| 48 | | 2.4 Red Iron oxide | 3.0 | Sol. Ferric pyrophosphate | 1.68 | 0.35 | 1.4 | | 2.1 | | 2.7 | | 1.2 | |
| 49 | | 1.2 Red Iron oxide | 3.0 | Sol. Ferric pyrophosphate | 0.84 | 0.35 | | | 4.0 | | | | 2.1 | |
| 50 | | 1.2 Red Iron oxide | 3.0 | Sol. Ferric pyrophosphate | 0.84 | 0.35 | 1.6 | 1.0 | 2.4 | 1.7 | 2.0 | 3.2 | 1.1 | 2.0 |
| 51 | | 1.2 Red Iron oxide | 3.0/3.0 | insol./sol. Ferric pyrophosphate | 1.56 | 0.56 | 0.6 | | 5.4 | | 1.6 | | 0.9 | |
| 52 | SAMPLE 6[2] | 1.2 Br. Iron oxide | 3.0 | Sol. Ferric pyrophosphate | 0.84 | 0.35 | 2.1 | 1.7 | 113.0 | 52.7 | 11.8 | 6.2 | 8.1 | 4.5 |
| 53 | | 1.2 Red Iron oxide | 3.0 | Sol. Ferric pyrophosphate | 0.84 | 0.35 | | | 21.0 | | | | 5.6 | |
| 54 | SAMPLE 7[2] | 1.2 Red Iron oxide | 3.0 | Sol. Ferric pyrophosphate | 0.84 | 0.35 | 4.2 | | 83.0 | | 3.8 | | 1.1 | |

[1]These compositions contain 0.3–0.5% tolytriazole for brass corrosion inhibition.
[2]Ammonium polyphosphate sample For comparative purposes, line 1 illustrates the average corrosion characteristics of neat concentrate and dilute solutions from Sample 1, taken from Table 1. Line 2 illustrates the average aluminum corrosion rate of the concentrate and diluted ammonium polyphosphate (as illustrated in Table 2) when the neat material was admixed with small amounts of iron oxide pigment and Attapulgus clay. Samples 1–4 were 10-34-0 type ammonium polyphosphate samples obtained from various sources. Samples 5–7 were 11-37-0 type ammonium polyphosphate samples obtained from various sources.

The data in Tables 1 and 2 illustrate that corrosive attack of aluminum was most severe when exposed to the fire retardant concentrate and its solutions at elevated (120° F./49° C.) temperature in the totally immersed configuration. Consequently, the evaluation of corrosion inhibiting systems stressed testing under these conditions. Periodic testing at other conditions was conducted. Lines 3 through 6 illustrate the corrosion inhibiting effectiveness of various combinations of insoluble brown iron oxide and soluble ferric pyrophosphate. The results indicate that the USDA, Forest Service Specifications for corrosivity of fire retardants are met when 1.2% of the brown iron oxide is used in conjunction with 3.0% of the soluble ferric pyrophosphate. In addition, the results indicate that lower amounts of insoluble iron oxide result in unacceptable corrosion rates in the concentrated retardant solution.

Lines 7 through 12 illustrate the effectiveness of corrosion inhibiting systems similar to those described in the preceding paragraph, except red iron oxide is substituted for brown iron oxide. The results indicate that the red iron oxide is effective in reducing the aluminum corrosion of the concentrated and diluted ammonium polyphosphate although perhaps not quite as effective as the brown iron oxide.

Lines 13–22 illustrate the corrosion inhibiting effectiveness of mixtures of insoluble iron oxide and soluble ferric citrate. The results indicate that ferric citrate is an equally effective substitute for soluble ferric pyrophosphate. In addition, the results indicate that a mixture of brown iron oxide and 3.0% soluble ferric citrate is capable of reducing the corrosivity of the ammonium polyphosphate samples to within acceptable levels for compliance with U.S. Forest Service Specifications for corrosivity of fire retardants.

Lines 23 and 24 illustrate the use of ferric ammonium citrate as a substitute for ferric citrate. The results indicate that the soluble ferric compounds are as effective as ammonium citrate in reducing corrosion of aluminum by ammonium polyphosphate solutions.

Lines 27 through 38 illustrate the effectiveness of systems in which only uncolored soluble and insoluble iron containing compounds are used rather than the relatively highly colored persistent iron oxides. This is important where true fugitive retardants are desired, whereby the color gradually fades when exposed to natural sunlight and disappears so as not to permanently stain that on which it is applied.

Lines 26 through 38 illustrate the effectiveness of mixtures of soluble and insoluble ferric pyrophosphate. Acceptable aluminum corrosion properties are obtained when 3.0% of the former and 1.2% of the latter are used as the corrosion inhibiting system in an ammonium polyphosphate solution. The results also indicate that an increased level of insoluble ferric pyrophosphate does not further reduce the corrosivity of the concentrate.

Lines 27 though 38 illustrate the aluminum corrosion inhibiting effectiveness of mixtures of the various soluble and insoluble iron compounds. Lines 37 and 38 revealed that, although effective, the tested ferrous salts were less effective at equivalent iron addition rates as compared to the ferric compounds.

Lines 39 through 44 illustrate the aluminum corrosion inhibiting effectiveness of various soluble and insoluble iron compounds when used in conjunction with 10-34-0 ammonium polyphosphate concentrates obtained from alternative sources. These data indicate that the amount and ratio of corrosion inhibitor necessary to reduce corrosivity to an acceptable level will need to be optimized dependent on the source and characteristics thereof.

Lines 45 through 54 illustrate the aluminum corrosion inhibiting effectiveness of the subject compounds when used in various sources of 11-37-0 type ammonium polyphosphate concentrate and their diluted solutions.

EXAMPLE 4

Corrosion Characteristics of Ammonium Polyphosphate Solutions Containing Water Soluble Iron Compounds Example 4 illustrates the effectiveness of water-soluble ferric pyrophosphate, ferric citrate and ferrous sulfate as aluminum corrosion inhibitors in ammonium polyphosphate solutions. In each sample, the indicated soluble iron compounds and 1.4% Attapulgus clay were admixed with neat ammonium polyphosphate. Aliquots were subsequently drawn from the concentrate and diluted with the prescribed amount of water. The aluminum corrosivity of both the concentrated fire retardants and their diluted solutions was determined in accordance with the aforementioned Forest Service Specifications. The results of this testing is shown in Table 4.

TABLE 4

| Ammonium Polyphosphate Samples | Soluble Iron Added | | Aluminum Corrosion[1] | |
|---|---|---|---|---|
| | (%) | Additive | Total Fe (%) | Concentrate | Dilute Solution |
| Average Sample from Table 1 | 0 | None | 0 | 106.6–170.0 | 5.8–39.0 |
| 1 | 0.6 | Soluble ferric pyrophosphate | 0.07 | 150.6 | 1.5 |
| 2 | 3.0 | Soluble ferric pyrophosphate | 0.35 | 42.5 | 1.6 |
| 3 | 3.0 | Soluble ferric pyrophosphate | 0.35 | 75.4 | 1.2 |
| 4 | 3.0 | Soluble ferric pyrophosphate | 0.35 | 69.3 | 1.3 |
| 5 | 2.4 | Soluble ferric citrate | 0.53 | 113.1 | 2.5 |
| 6 | 3.0 | Soluble ferric citrate | 0.66 | 124.1 | 2.4 |
| 7 | 3.0 | Soluble ferric citrate | 0.66 | 17.0 | 1.1 |
| 8 | 3.0 | Ferrous sulfate · $7H_2O$ | 0.60 | 27.9 | 3.1 |

[1]Aluminum 2024T3 coupons tested in the manner described in USDA, Forest Service specification 5100-304b. Values obtained when the corrosion cell was maintained at 120° F. (50° C.) for 90 days with the coupon totally immersed therein. The data is expressed in milli-inches per year.

The results indicate that both soluble ferric and ferrous iron containing salts show utility as aluminum corrosion inhibitors in ammonium polyphosphate solutions. Relatively small concentrations (0.35%) of soluble iron derived from a soluble ferric pyrophosphate decreased the corrosion rate of totally immersed aluminum exposed to 120° F. solutions of the diluted fire retardant to within the USDA Forest Service Specification requirements. The data illustrate that soluble iron containing compounds are most effective in controlling the corrosivity of diluted solutions. Since the corrosivity of both the concentrate and its diluted solutions is of importance, mixtures of water soluble and water insoluble iron compounds generally provide superior performance.

EXAMPLE 5

Corrosion Characteristics of Ammonium Polyphosphate Solutions Containing Other Water Insoluble Iron Compounds Table 5 illustrates the effectiveness of water insoluble ferric orthophosphate, insoluble ferric pyrophosphate and ferrous oxalate as aluminum corrosion inhibitors in ammonium polyphosphate concentrates and their dilute solutions. 1.4% Attapulgus clay was mixed with the concentrated ammonium polyphosphate, with the exception of samples 6 and 7 which contained 0.7% and 2.8% Attapulgus clay, respectively. Samples 13, 18 and 24 contained, also, an insoluble iron oxide as a solution colorant. The resultant fire retardant concentrates and their dilute solutions were evaluated in terms of aluminum corrosivity in accordance with the USDA Forest Service Specification requirements. The results of the testing are shown in Table 5 below.

TABLE 5

| Ammonium Poly-phosphate Samples | Iron Oxide Addition | | Other Insol. Fe Additive | | Total Fe. Content | Neat Concentrate | | | | Diluted Solution | | | |
|---|---|---|---|---|---|---|---|---|---|---|---|---|---|
| | % | Type | % | Additive | (%) | 70° F. Total | 70° F. partial | 120° F. total | 120° F. Partial | 70° F. total | 70° F. partial | 120° F. total | 120° F. partial |
| | | | | | | Corrosion Rate (milli-inches per year) | | | | | | | |
| 1 Neat 10-34-0[1] | 0.0 | None | 0.0 | None | 0.00 | 9.1 | 5.2 | 140.6 | 79.5 | 10.8 | 6.9 | 16.0 | 9.4 |
| 2 Sample 1 | 0.0 | None | 1.2 | Ferric pyrophosphate | 0.29 | | | 2.9 | | | | 1.7 | |
| 3 Sample 2 | 0.0 | None | 2.4 | Ferric pyrophosphate | 0.58 | | | 9.4 | | | | 3.7 | |
| 4 Sample 3 | 0.0 | None | 3.0 | Ferric pyrophosphate | 0.72 | | | 3.5 | | | | 1.1 | |
| 5 Sample 4 | 0.0 | None | 3.0 | Ferric pyrophosphate | 0.72 | | | 6.5 | | | | 2.2 | |
| 6 Sample 5 | 0.0 | None | 3.0 | Ferric pyrophosphate | 0.72 | | | 2.1 | | | | 1.4 | |
| 7 Sample 6 | 0.0 | None | 3.0 | Ferric pyrophosphate | 0.72 | | | 3.6 | | | | 2.1 | |
| 8 Sample 7 | 0.0 | None | 3.0 | Ferric pyrophosphate | 0.72 | | | 1.0 | | | | 1.7 | |
| 9 Sample 8 | 0.0 | None | 2.4 | Ferric pyrophosphate | 0.58 | | | 10.7 | | | | 1.0 | |
| 10 Sample 9 | 0.0 | None | 3.0 | Ferric pyrophosphate | 0.72 | | | 5.5 | | | | 6.3 | |
| 11 Sample 10 | 0.0 | None | 3.0 | Ferric pyrophosphate | 0.72 | 2.4 | | 6.2 | | 3.1 | | 1.1 | |
| 12 Sample 11 | 0.0 | None | 3.0 | Ferric pyrophosphate | 0.72 | | | 3.4 | | | | 1.3 | |
| 13 Sample 12 | 0.0 | None | 3.0 | Ferric pyrophosphate | 0.72 | | | 3.2 | | | | 2.2 | |
| 14 Sample 13[2] | 1.2 | Red Iron oxide | 0.0 | None | 0.84 | 3.7 | 3.0 | 8.3 | 6.4 | 4.4 | 4.2 | 4.6 | 3.5 |
| 15 Sample 14 | 1.2 | Red Iron oxide | 3.0 | Ferric pyrophosphate | 1.56 | 2.0 | 1.3 | 4.8 | 3.0 | 1.5 | 3.1 | 0.8 | 2.0 |
| 16 Sample 15 | 1.2 | Red Iron oxide | 3.0 | Ferric pyrophosphate | 1.56 | 1.6 | | 6.2 | | 1.6 | | 1.0 | |
| 17 Sample 16 | 1.2 | Red Iron oxide | 3.0 | Ferric pyrophosphate | 1.56 | 2.5 | | 0.7 | | 2.5 | | 0.6 | |
| 18 Sample 17 | 1.2 | Red Iron oxide | 3.0 | Ferric pyrophosphate | 1.56 | 1.9 | 1.2 | 0.5 | 0.2 | 1.1 | 2.4 | 0.8 | 1.9 |
| 19 Sample 18 | 1.2 | Red Iron oxide | 3.0 | Ferric pyrophosphate | 1.56 | 2.1 | | 2.7 | | 1.1 | | 0.8 | |
| 20 Sample 19 | 0.0 | None | 1.2 | Ferric orthophosphate | 0.16 | | | 105.3 | | | | 1.7 | |
| 21 Sample 20 | 0.0 | None | 1.8 | Ferric orthophosphate | 0.55 | | | 108.6 | | | | 3.8 | |
| 22 Sample 21 | 0.0 | None | 2.4 | Ferric orthophosphate | 0.73 | | | 9.3 | | | | 4.1 | |
| 23 Sample 22 | 0.0 | None | 3.0 | Ferric orthophosphate | 0.92 | | | 2.3 | | | | 4.2 | |

TABLE 5-continued

| Ammonium Poly-phosphate Samples | Iron Oxide Addition % | Iron Oxide Addition Type | Other Insol. Fe Additive % | Other Insol. Fe Additive Additive | Total Fe. Content (%) | Neat Concentrate 70° F. Total | Neat Concentrate 70° F. partial | Neat Concentrate 120° F. total | Neat Concentrate 120° F. Partial | Diluted Solution 70° F. total | Diluted Solution 70° F. partial | Diluted Solution 120° F. total | Diluted Solution 120° F. partial |
|---|---|---|---|---|---|---|---|---|---|---|---|---|---|
| | | | | | | Corrosion Rate (milli-inches per year) | | | | | | | |
| 24 Sample 23 | 1.2 | Brown Iron oxide | 3.0 | Ferric orthophosphate | 1.25 | | | 1.5 | | | | 1.0 | |
| 25 Sample 24 | 0.0 | None | 1.2 | Ferrous oxalate | 0.37 | | | 90.0 | | | | 2.7 | |

(1)Average values from Table 1
(2)See Table 2.

The corrosion inhibiting effectiveness of insoluble ferric pyrophosphate was shown by a comparison of the compositions containing only this component, lines 2–13, with line 1. The effectiveness was also shown by comparison with 1.2% red iron oxide, line 14. These comparisons illustrate the effectiveness of insoluble ferric pyrophosphate as an aluminum corrosion inhibitor for concentrated ammonium polyphosphate and its solutions. It was shown to be superior to red iron oxide when compared on an equal ferric iron level. Accordingly, the insoluble ferric pyrophosphate would be preferred in many applications since it is not highly colored like the conventional iron oxides, which result in highly visible and persistent discoloration of that on which it is applied. Consequently, inhibitor systems containing these components would be suitable for use in fugitive colored fire retardant formulations.

The data contained in lines 15–19 illustrate the further reduction in aluminum corrosion, which was obtained by combining iron oxide and ferric pyrophosphate in the same corrosion inhibiting system. The results indicate that several of these formulations met the USDA, Forest Service Specifications for corrosivity of aluminum in both the concentrate and dilute forms.

The data contained in lines 20 and 23 illustrates the effectiveness of insoluble ferric orthophosphate in inhibiting the corrosion of aluminum exposed to ammonium polyphosphate solutions. The results indicate that the pyrophosphate moiety may be somewhat superior to orthophosphate for inhibiting the corrosion of aluminum.

The data contained in line 24 illustrates that increasing the ferric iron content of the corrosion inhibiting system by using mixtures of ferric orthophosphate and iron oxide is also an effective way of meeting the USDA, Forest Service Specifications for corrosivity of aluminum.

The data contained in line 25 illustrates the aluminum corrosion inhibiting effectiveness of small amounts of ferrous (FeII) iron when incorporated in ammonium polyphosphate concentrates and their dilute solutions.

EXAMPLE 6

Effectiveness of Azoles as Corrosion Inhibitors in Ammonium Polyphosphate Fire Retardant Compositions Example 6 illustrates the effectiveness of azoles as yellow brass corrosion inhibitors in concentrated ammonium polyphosphate based fire retardant formulations and in their dilute solutions. Each sample was prepared by admixing 1.4% Attapulgus clay, 1.2% red iron oxide and the indicated azole corrosion inhibitor in the neat, concentrated ammonium polyphosphate. Subsequently, the concentrates were diluted with water in the manner described herein. The samples were then tested in accordance with USDA Forest Service Specification requirements.

TABLE 6

THE IMPACT OF AZOLES ON THE CORROSION OF YELLOW BRASS EXPOSED TO CONCENTRATED AMMONIUM POLYPHOSPHATE AND ITS DILUTED SOLUTIONS.*

| | Corrosion of exposed yellow brass (mpy) | | | | | | | |
|---|---|---|---|---|---|---|---|---|
| | Concentrated Retardant | | | | | | Diluted Solution | |
| Corrosion Inhibitor System | 70 T** | 70 P | 120 T | 120 P | 70 T | 70 P | 120 T | 120 P |
| None | 0.5 | 0.6 | 0.6 | 2.0 | 1.5 | 5.7 | 20.3 | 14.9 |
| 0.3% tolytriazole | | | 0.2 | | | | 0.3 | |
| 0.5% tolytriazole | 0.0 | 0.1 | 0.1 | 0.1 | 0.0 | 0.0 | 0.0 | 0.0 |
| 0.25% sodium tolyl triazole*** | | | 0.2 | | | | 0.1 | |
| 0.255% sodium tolyl-triazole+ | | | 0.2 | | | | 0.1 | |
| 0.425% sodium tolyl-triazole+ | | | 0.2 | | | | 0.1 | |
| 0.5% sodium tolyl-triazole*** | | | 0.1 | | | | 0.2 | |
| 0.5% sodium triazole++ | 0.1 | 0.1 | 0.1 | 0.1 | 0.1 | 0.3 | 0.3 | |
| 1.0% sodium triazole++ | 0.1 | 0.1 | 0.1 | 0.1 | 0.1 | 0.1 | 0.1 | |

*10-34-0 containing 1.4% Attapulgus clay and 1.2% red iron oxide in addition to the described inhibitor additive.
**70 and 120 refer to the solution storage temperature in ° F., T and P refer to total of partial immersion of the metal coupon in the retardant solution during storage
***from a 50% aqueous solution of sodium tolytriazole.
+from an 85% aqueous solution of sodium tolytriazole.
++from 100% sodium triazole.

The results indicate that azoles, including both tolytriazoles and salts thereof are effective corrosion inhibitors for yellow brass in ammonium polyphosphate concentrates and solutions. These data and others included in previous Examples illustrate the advantages of using azoles in conjunction with the iron containing inhibitors of this invention to reduce both aluminum and brass corrosivity of the fire retardant compositions to within desirable limits.

EXAMPLE 7

The Impact of Phosphonates on Ammonium Polyphosphate Type Fire Retardants

Samples of selected commercially-available phosphonates were obtained and utilized in two studies designed to determine their impact on aluminum corrosion when blended with ammonium polyphosphate type fire retardants. In the first test series (TABLE 7A), each phosphonate was introduced at 1% based on the total ammonium polyphosphate solution. In the second test series (TABLE 7B), each phosphonate was introduced at 1% based on active phosphonic acid content. The samples were blended for 15 minutes with a laboratory stirrer fitted with a 2-inch propeller blade/shaft assembly rotating at 1500–800 rpm. Each resultant solution was divided into two one-quart jars filled to 800 ml ("milliliters"). The remaining solution was diluted with 4.25 parts water per part solution by volume and divided equally into two one-quart jars. The first pair represented the test concentrate, while the second pair represented the test dilute solution. Two one-quart jars were filled to 800 ml with uninhibited ammonium polyphosphate type fire retardant and two one-quart jars were filled to 800 ml with ammonium polyphosphate fire retardant solution, and diluted with 4.25 parts water per part fire retardant solution by volume. These uninhibited ammonium polyphosphate solutions were the standards for corrosion rate comparison.

Each of the phosphonates were utilized in a second study. 1% of the phosphonic acid, based on total solution weight, was added to each ammonium polyphosphate fire retardant samples. It should be noted that "1% Tot" means 1% phosphonate, by weight; "1% Act" means 1% phosphonic acid component, by weight. All of the samples were tested in accordance the above-described U.S. Forest Service corrosion testing procedures. "Change" is determined by comparing the range obtained from the uninhibited average plus or minus twice the standard deviation ($2\sigma$) of the solution average of interest. The results are shown in Tables 7C and 7D below.

TABLE 7A

SAMPLES CONTAINING 1% PHOSPHONATE BASED ON TOTAL AMMONIUM POLYPHOSPHATE FIRE RETARDANT

| Component | A | B | C | D | E | F | G | H |
|---|---|---|---|---|---|---|---|---|
| Ammonium Polyphosphate | 100.0 | 99.0 | 99.0 | 99.0 | 99.0 | 99.0 | 99.0 | 99.0 |
| ATMP | 0 | 1.0 | 0 | 0 | 0 | 0 | 0 | 0 |
| ATMP, in conc. | 0 | 0 | 1.0 | 0 | 0 | 0 | 0 | 0 |
| $Na_5ATMP$ | 0 | 0 | 0 | 1.0 | 0 | 0 | 0 | 0 |
| HEDP | 0 | 0 | 0 | 0 | 1.0 | 0 | 0 | 0 |
| $Na_4HEDP$ | 0 | 0 | 0 | 0 | 0 | 1.0 | 0 | 0 |
| $K_6HDTMP$ | 0 | 0 | 0 | 0 | 0 | 0 | 1.0 | 0 |
| $Na_6DTPMP$ | 0 | 0 | 0 | 0 | 0 | 0 | 0 | 1.0 |
| TOTAL | 100% | 100% | 100% | 100% | 100% | 100% | 100% | 100% |

TABLE 7B

SAMPLES CONTAINING 1% PHOSPHONATE BASED ON PHOSPHONIC ACID CONTENT

| Component | A | B | C | D | E | F | G | H |
|---|---|---|---|---|---|---|---|---|
| Ammonium Polyphosphate | 100.0 | 98.0 | 98.0 | 96.55 | 98.33 | 95.24 | 95.65 | 96.0 |
| ATMP | 0 | 2.0 | 0 | 0 | 0 | 0 | 0 | 0 |
| ATMP, in conc. | 0 | 0 | 2.0 | 0 | 0 | 0 | 0 | 0 |
| $Na_5ATMP$ | 0 | 0 | 0 | 3.45 | 0 | 0 | 0 | 0 |
| HEDP | 0 | 0 | 0 | 0 | 1.67 | 0 | 0 | 0 |
| $Na_4HEDP$ | 0 | 0 | 0 | 0 | 0 | 4.76 | 0 | 0 |
| $K_6HDTMP$ | 0 | 0 | 0 | 0 | 0 | 0 | 4.35 | 0 |
| $Na_6DTPMP$ | 0 | 0 | 0 | 0 | 0 | 0 | 0 | 4.0 |
| TOTAL | 100% | 100% | 100% | 100% | 100% | 100% | 100% | 100% |

TABLE 7C

THE IMPACT OF 1% PHOSPHONATE BASED ON TOTAL AMMONIUM POLYPHOSPHATE FIRE RETARDANT

| Description | Concentrate | | | | | Dilute | | | | |
|---|---|---|---|---|---|---|---|---|---|---|
| | $1^{st}$ | $2^{nd}$ | Average | $2\sigma$ | Change | $1^{st}$ | $2^{nd}$ | Average | $2\sigma$ | Change |
| Uninhibited Ammonium Polyphosphate | 74.1 | 89.7 | 81.9 | 22.0 | None | 5.0 | 5.1 | 5.0 | 0.1 | None |
| ATMP 1% Tot | 80.6 | 93.4 | 87.0 | 18.1 | None | 3.0 | 4.4 | 3.7 | 1.9 | Decrease |
| ATMP, in conc. 1% Tot | 104.1 | 78.6 | 91.4 | 36.1 | None | 3.8 | 3.6 | 3.7 | 0.2 | Decrease |

TABLE 7C-continued

THE IMPACT OF 1% PHOSPHONATE BASED ON TOTAL AMMONIUM POLYPHOSPHATE FIRE RETARDANT

| Description | Concentrate | | | | | Dilute | | | | |
|---|---|---|---|---|---|---|---|---|---|---|
| | 1st | 2nd | Average | 2σ | Change | 1st | 2nd | Average | 2σ | Change |
| Na$_5$ATMP 1% Tot | 108.3 | 64.4 | 86.3 | 62.1 | None | 3.5 | 4.1 | 3.8 | 0.9 | Decrease |
| HEDP 1% Tot | 82.9 | 87.6 | 85.2 | 6.6 | None | 3.2 | 2.8 | 3.0 | 0.6 | Decrease |
| Na$_4$HEDP 1% Tot | 86.7 | 78.1 | 82.4 | 12.2 | None | 2.9 | 3.1 | 3.0 | 0.3 | Decrease |
| K$_6$HDTMP 1% Tot | 34.8 | 32.0 | 33.4 | 3.9 | Decrease | 2.2 | 2.7 | 2.4 | 0.6 | Decrease |
| Na$_6$DTPMP 1% Tot | 94.0 | 101.6 | 97.8 | 10.8 | None | 3.3 | 3.2 | 3.3 | 0.2 | Decrease |

TABLE 7D

THE IMPACT OF 1% PHOSPHONATE BASED ON ACTIVE PHOSPHONIC ACID CONTENT

| | 1st | 2nd | Avg | 2σ | Change | 1st | 2nd | Avg | 2σ | Change |
|---|---|---|---|---|---|---|---|---|---|---|
| Uninhibited Ammonium Polyphosphate | 135.2 | 90.8 | 113.0 | 62.7 | None | 4.0 | 3.8 | 3.9 | 0.3 | None |
| ATMP 1% Act | 151.5 | 125.5 | 138.5 | 36.7 | None | 4.3 | 3.3 | 3.8 | 1.4 | None |
| ATMP, in conc. 1% Act | 91.5 | 96.7 | 94.1 | 7.3 | None | 3.7 | 3.4 | 3.6 | 0.3 | Decrease |
| Na$_5$ATMP 1% Act | 125.4 | 131.3 | 128.3 | 8.4 | None | 3.6 | 3.9 | 3.7 | 0.3 | None |
| HEDP 1% Act | 98.9 | 85.6 | 92.3 | 18.7 | None | 3.1 | 3.4 | 3.3 | 0.5 | Decrease |
| Na$_4$HEDP 1% Act | 113.2 | 73.4 | 93.2 | 56.3 | None | 6.5 | 6.2 | 6.4 | 0.5 | Increase |
| K$_6$HDTMP 1% Act | 32.5 | 40.1 | 36.3 | 10.8 | Decrease | 2.7 | 2.5 | 2.6 | 0.4 | Decrease |
| Na$_6$DTPMP 1% Act | 122.6 | 127.1 | 124.9 | 6.5 | None | 9.8 | 9.0 | 9.4 | 1.2 | Increase |

The results indicate that the addition of 1% K$_6$HDTMP to ammonium polyphosphate concentrates reduced aluminum corrosion by about 60% to about 70%, dependent on use level. Accordingly, the addition of K$_6$HDTMP significantly impacts the corrosivity of the ammonium polyphosphate concentrates. The addition of 1% K$_6$HDTMP also reduces the aluminum corrosivity of the dilute ammonium polyphosphate solutions by about 50%. The results indicate, however, that increasing the concentration of K$_6$HDTMP does not improve corrosion inhibition performance in these retardants.

EXAMPLE 8

Ammonium Polyphosphate Fire Retardants Comprising Tolytriazole, its Derivatives and Phosphonate Samples were prepared using ammonium polyphosphate solution, attapulgus clay, red iron oxide, and K$_6$HDTMP, tolytriazole, or Petrolite X-8089, in the amounts indicated in Table 8 below. The dry powder additives were combined and mixed prior to addition to the ammonium polyphosphate solution. The liquid additives were added separately after the powders. After all of the ingredients were added, the mixing speed was increased from 2.5 to 6, and the samples were then allowed to mix at that speed for one hour each, with the exception of the ammonium polyphosphate solution only sample. The sample that comprised only the ammonium polyphosphate solution was stirred with a propeller blade attached to a hand drill. After mixing for one hour, the solution viscosity was determined. When the viscosity was at least 50 centipoise ("cps"), the solution was deemed ready to use, and if not, allowed to mix an additional 15 minutes and continued in this manner until acceptable viscosity was achieved. Dilute solutions were then prepared by admixing 4.25 parts tap water with 1 part concentrate, volume to volume. The results are shown in Table 8 below. It should be noted that the corrosion data presented in Table 8 are averages of duplicate samples. In addition, "70" and "120" refer to the storage temperature; while "T" and "P" refer to coupon immersion, i.e., either total or partial. Solutions that did not have coupons in them were stored at room temperature.

TABLE 8

AMMONIUM POLYPHOSPHATE FIRE RETARDANTS COMPRISING TOLYTRIAZOLE, ITS DERIVATIVES AND PHOSPHONATE

| | Samples | | | | | | |
|---|---|---|---|---|---|---|---|
| | A | B | C* | D* | E* | F | G |
| Components | Percent in Formulation | | | | | | |
| Ammonium Polyphosphate | 100 | 97.4 | 96.4 | 93.05 | 88.7 | 95.9 | 95.9 |
| Clay | | 1.4 | 1.4 | 1.4 | 1.4 | 1.4 | 1.4 |

TABLE 8-continued

AMMONIUM POLYPHOSPHATE FIRE RETARDANTS COMPRISING TOLYTRIAZOLE, ITS DERIVATIVES AND PHOSPHONATE

| | Samples | | | | | | |
|---|---|---|---|---|---|---|---|
| | A | B | C* | D* | E* | F | G |
| Red Iron Oxide | | 1.2 | 1.2 | 1.2 | 1.2 | 1.2 | 1.2 |
| K$_6$HPTMP | | | 1.0 | 4.35 | 8.7 | 1.0 | 1.0 |
| Tolyltriazole | | | | | | 0.5 | |
| Petrolite X-8089 | | | | | | | 0.5 |
| Concentrate Characteristics | | | | | | | |
| Viscosity (CPS) | 40 | 60 | 70 | 58 | 50 | 67 | 59 |
| Corrosion | | | | | | | |
| Aluminum | | | | | | | |
| 70 T | 12.4 | 4.6 | 2.4 | 4.7 | 5.5 | 4.5 | 5.1 |
| 70 P | 6.6 | 3.6 | 2.1 | 2.9 | 4.7 | 2.9 | 3.2 |
| 120 T | 106.6 | 7.3 | 4.7 | 4.6 | 4.3 | 7.7 | 8.5 |
| 120 P | 78.5 | 5.0 | 26.16 | 6.6 | 4.6 | 5.1 | 6.3 |
| Yellow Brass | | | | | | | |
| 70 T | 0.8 | 1.1 | 0.4 | 0.5 | 0.7 | 0.0 | 0.1 |
| 70 P | 1.0 | 1.1 | 0.4 | 0.5 | 0.6 | 0.1 | 0.2 |
| 120 T | 1.1 | 1.0 | 0.4 | 0.4 | 0.6 | 0.1 | 0.1 |
| 120 P | 2.9 | 1.2 | 1.2 | 1.0 | 1.2 | 0.1 | 0.1 |
| Steel | | | | | | | |
| 70 T | 2.4 | 4.6 | 1.2 | 1.3 | 2.3 | 1.3 | 1.4 |
| 70 P | 1.6 | 3.6 | 0.9 | 1.1 | 1.8 | 0.9 | 0.9 |
| 120 T | 2.1 | 7.3 | 0.9 | 1.0 | 1.2 | 1.1 | 1.1 |
| 120 P | 1.8 | 5.0 | 1.2 | 1.0 | 1.3 | 1.0 | 1.0 |
| Diluted Solution Characteristics | | | | | | | |
| Viscosity (cps) | 5 | 8 | 8 | 8 | 5 | 8 | 7 |
| Corrosion | | | | | | | |
| Aluminum | | | | | | | |
| 70 T | 15.2 | 6.7 | 5.1 | 4.2 | 5.0 | 4.9 | 5.6 |
| 70 P | 8.4 | 4.4 | 4.2 | 4.4 | 4.5 | 4.2 | 4.2 |
| 120 T | 10.1 | 4.0 | 1.8 | 2.4 | 2.4 | 3.1 | 3.1 |
| 120 P | 5.6 | 3.6 | 3.1 | 2.6 | 2.7 | 2.2 | 2.7 |
| Yellow Brass | | | | | | | |
| 70 T | 1.1 | 1.1 | 0.8 | 0.8 | 1.0 | 0.0 | 0.4 |
| 70 P | 4.4 | 4.8 | 4.1 | 3.9 | 4.0 | 0.0 | 0.0 |
| 120 T | 2.8 | 1.3 | 1.2 | 2.4 | 1.9 | 0.0 | 0.1 |
| 120 P | 13.5 | 13.9 | 13.7 | 13.0 | 13.6 | 0.0 | 0.1 |
| Steel | | | | | | | |
| 70 T | 2.3 | 1.8 | 2.1 | 2.7 | 1.8 | 3.4 | 3.9 |
| 70 P | 4.1 | 2.1 | 2.3 | 2.4 | 2.1 | 2.7 | 2.4 |
| 120 T | 1.4 | 0.6 | 0.6 | 0.6 | 0.5 | 1.0 | 1.1 |
| 120 P | 2.6 | 1.5 | 1.3 | 1.1 | 1.2 | 1.4 | 1.5 |

Formulations C, D & E with phosphonate percent in formulation of active content; @ 1% = 0.23% act., @ 4.35% = 1.0% act., and @ 8.7% = 2.0% act.

The results indicate that the addition of clay and red iron oxide dramatically reduce the aluminum corrosion of ammonium polyphosphate concentrates, but appeared to increase the corrosion of steel in ammonium polyphosphate concentrates. K$_6$HDTMP appeared to have only a slightly positive effect on aluminum corrosion, although no difference was seen between 1.0 and 8.7%. The addition of half of a percentage of tolytriazole had a dramatic effect on yellow brass corrosion, and reduced the corrosion to zero in the dilute solution. Petrolite® X-8089, at the same addition level, also had a significant positive impact on brass corrosion in both concentrate and dilute ammonium polyphosphate solutions.

What is claimed is:

1. A corrosion-inhibited fire retardant composition comprising:
   at least one fire retardant composition comprising an ammonium polyphosphate;
   at least one suspending agent;
   a phosphonate selected from the group consisting of aminotri(methylenephosphonic acid), 1-hydroxyethylidene-1,1-diphosphonic acid, hexamethylenediaminetetra(methylenephosphonic acid), diethylenetriaminepenta(methylenephosphonic acid), and salts thereof, and mixtures thereof; and
   a corrosion inhibiting system comprising at least one corrosion inhibiting compound selected from the group consisting of azoles, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxalate, ferrous oxide, ferric lactate, ferric resinate, and any combination thereof;
   wherein said corrosion inhibiting system is present in a minor amount effective to substantially reduce corrosiveness of said fire retardant composition.

2. The composition of claim 1 wherein said azoles are selected from the group consisting of tolytriazole, benzotriazole, mercaptobenzothiazole, dimercaptomthiadiazole, 1,2 benzisothiazoline-3-1,2-benzimidazolone, 4,5,6,7-tetrahydrobenzotriazole, tolylimidazole, 2-(5-ethyl-2-pyridyl) benzimidazole, phthalimide, any alkali metal salts thereof and combinations thereof.

3. The composition of claim 1 further comprising at least one additive selected from the group consisting of coloring agents, surfactants, stabilizers, rheological modifiers, opacifying pigments and any combination thereof.

4. The composition of claim 1 wherein said composition is a concentrate suitable for dilution for application, said at least one corrosion inhibiting compound is at least one azole and said at least one azole is present in said corrosion-inhibited fire retardant composition, in concentrate, in a minor amount effective to obtain a maximum corrosivity of yellow brass to a maximum of 5.0 mils per year, as determined by the "Uniform Corrosion" test set forth in Section 4.5.6.1 of "Specification 5100-304b (January 2000) Superseding Specification 5100-00304a (February 1986)," entitled "Specification for Long Term Retardant, Wildland Fire, Aircraft or Ground Application," issued by the United States Department of Agriculture, Forest Service.

5. The composition of claim 3 wherein said coloring agents are selected from the group consisting of fugitive coloring agents, non-fugitive coloring agents and pigments, extenders, opacifying pigments, and highly colored pigments.

6. The composition of claim 1 wherein said at least one suspending agent is selected from the group consisting of Attapulgus, Sepiolite, Fuller's earth, Montmorillonite, and Kaolin clays.

7. The composition of claim 1 wherein said corrosion inhibiting system at least one water-soluble corrosion inhibiting compound and at least one water-insoluble corrosion inhibiting compound.

8. The composition of claim 1 wherein said composition is a concentrate suitable for dilution for application, said corrosion inhibiting system is present in said corrosion-inhibited fire retardant composition in a minor amount effective to obtain of a maximum corrosivity to aluminum, yellow brass or steel of 5.0 mils per year, as determined by the "Uniform Corrosion" test set forth in Section 4.5.6.1 of "Specification 5100-304b (January 2000) Superseding Specification 5100-00304a (February 1986)." entitled "Specification for Long Term Retardant, Wildland Fire, Aircraft or Ground Application," issued by the United States Department of Agriculture, Forest Service.

9. The composition of claim 1 further comprising water.

10. The composition of claim 1 comprising from about 0.01% by weight to about 10% by weight of said corrosion inhibiting system.

11. The composition of claim 1 comprising from about 0.30% by weight to about 6.0% by weight of said corrosion inhibiting system.

12. The composition of claim 1 comprising from about 0.6% by weight to about 5.0% by weight of said corrosion inhibiting system.

13. The composition of claim 1 wherein said phosphonate is aminotri(methylenephosphonic acid), or a salt thereof.

14. The composition of claim 1 wherein said phosphonate is pentasodium aminotri(methylenephosphonic acid).

15. The composition of claim 1 wherein said phosphonate is 1-hydroxyethylidene-1,1-diphosphonic acid, or a salt thereof.

16. The composition of claim 1 wherein said phosphonate is tetrasodium 1-hydroxyethylidene-1,1-diphosphonic acid.

17. The composition of claim 1 wherein said phosphonate is hexamethylenediaminetetra(methylenephosphonic acid), or a salt thereof.

18. The composition of claim 1 wherein said phosphonate is hexapotassium hexamethylenediaminetetra(methylenephosphonic acid).

19. The composition of claim 1 wherein said phosphonate is diethylenetriaminepenta(methylenephosphonic acid), or a salt thereof.

20. The composition of claim 1 wherein said phosphonate is hexasodium diethylenetriaminepenta(methylenephosphonic acid).

21. The composition of claim 1 wherein the phosphate makes up less than about 10% by weight of said corrosion-inhibited fire retardant composition.

22. The composition of claim 1 wherein the phosphonate makes up from about 1% by weight to about 10% by weight of said corrosion-inhibited fire retardant composition.

23. The composition of claim 1 wherein the phosphonate makes up about 4.35% by weight of said corrosion-inhibited fire retardant composition.

24. The composition of claim 3 wherein said rheological modifiers are selected from the group consisting of guar gum, derivatized guar gum and xanthan gum.

25. A method of preparing a ready-to-use corrosion-inhibited fire retardant composition, adapted for application to wildland fires, the method comprising the steps of:
(a) forming an intermediate concentrate composition comprising the corrosion-inhibited fire retardant composition of claim 1; and
(b) diluting said intermediate concentrate composition with water to form said ready-to-use corrosion-inhibited fire retardant composition.

26. The method of claim 25 wherein said azoles are selected from the group consisting of tolytriazole, benzotriazole, mercaptobenzothiazole, dimercaptomthiadiazole, 1,2 benzisothiazoline-3-1,2-benzimidazolone, 4,5,6,7-tetrahydrobenzotriazole, tolylimidazole,2-(5-ethyl-2-pyridyl) benzimidazole, phthalimide, any alkali metal salts thereof and combinations thereof.

27. The method of claim 25 wherein said corrosion inhibiting system comprises at least one water-soluble corrosion inhibiting compound and at least one water-insoluble corrosion inhibiting compound.

28. The method of claim 25 wherein said intermediate concentrate composition further comprises at least one additive selected from the group consisting of coloring agents, surfactants, stabilizers, rheological modifiers, opacifying pigments and any combination thereof.

29. The method of claim 25 wherein said corrosion inhibiting system comprises at least one azole and said at least one azole is present in said intermediate concentrate composition in a minor amount effective to obtain a maximum corrosivity of yellow brass to 5.0 mils per year, as determined by the "Uniform Corrosion" test set forth in Section 4.5.6.1 of "Specification 5100-304b (January 2000) Superseding Specification 5100-00304a (February 1986)," entitled "Specification for Long Term Retardant, Wildland Fire, Aircraft or Ground Application," issued by the United States Department of Agriculture, Forest Service.

30. The method of claim 25 wherein said corrosion inhibiting system is present in a minor amount effective to reduce the corrosiveness of said fire retardant composition, in concentrate, to at least one of a maximum corrosivity of aluminum to 5.0 mils per year, brass to 5.0 mils per year, and steel to 5.0 mils per year, as determined by the "Uniform Corrosion" test set forth in Section 4.5.6.1 of "Specification 5100-304b (January 2000) Superseding Specification 5100-00304a (February 1986)," entitled "Specification for Long Term Retardant, Wildland Fire, Aircraft or Ground Application," issued by the United States Department of Agriculture, Forest Service.

31. The method of claim 25 wherein said intermediate concentrate composition is diluted such that the ready-to-use corrosion-inhibited fire retardant composition has a maximum corrosivity to aluminum of 2.0 mils per year and to brass and steel of 2.0 mils per year when tested in the totally immersed condition and 5.0 mils per year when tested in the partially immersed condition, as specified and determined by the "Uniform Corrosion" test set forth in Section 4.5.6.1 of "Specification 5100-304b (January 2000) Superseding Specification 5100-00304a (February 1986)," entitled "Specification for Long Term Retardant, Wildland Fire, Aircraft or Ground Application," issued by the United States Department of Agriculture, Forest Service.

32. The method of claim 28 wherein said intermediate concentrate compostion further comprises at least one coloring agent selected from the group consisting of fugitive coloring agents, non-fugitive coloring agents and pigments, extenders, opacifying pigments, and highly colored pigments.

33. The method of claim 25 wherein said at least one suspending agent is selected from the group consisting of Attapulgus clay, Sepiolite, Fuller's earth, Montmorillonite, and Kaolin clays.

34. The method of claim 25 wherein said phosphonate is aminotri(methylenephosphonic acid), or a salt thereof.

35. The method of claim 25 wherein said phosphonate is pentasodium aminotri(methylenephosphonic acid).

36. The method of claim 25 wherein said phosphonate is 1-hydroxyethylidene-1,1-diphosphonic acid, or a salt thereof.

37. The method of claim 25 wherein said phosphonate is tetrasodium 1-hydroxyethylidene-1,1-diphosphonic acid.

38. The method of claim 25 wherein said phosphonate is hexamethylenediaminetetra(methylenephosphonic acid), or a salt thereof.

39. The method of claim 25 wherein said phosphonate is hexapotassium hexamethylenediaminetetra(methylenephosphonic acid).

40. The method of claim 25 wherein said phosphonate is diethylenetriaminepenta(methylenephosphonic acid), or a salt thereof.

41. The method of claim 25 wherein said phosphonate is hexasodium diethylenetriaminepenta(methylenephosphonic acid).

42. The method of claim 25 wherein the phosphonate makes up less than about 10% by weight of said ready-to-use corrosion-inhibited fire retardant composition.

43. The method of claim 25 wherein the phosphonate makes up from about 1% by weight to about 10% by weight of said ready-to-use corrosion-inhibited fire retardant composition.

44. The method of claim 25 wherein the phosphonate about 4.35% by weight of said ready-to-use corrosion-inhibited fire retardant composition.

45. The method of claim 28 wherein said rheological modifiers are selected from the group consisting of guar gum, derivatized guar gum and xanthan gum.

46. A method of suppressing wildland fires comprising aerially applying to wildland vegetation a fire suppressing composition comprising:
water; and
the corrosion-inhibited fire retardant composition of claim 1.

47. The method of claim 46 wherein said azoles are selected from the group consisting of tolytriazole, benzotriazole, mercaptobenzothiazole, dimercaptomthiadiazole, 1,2 benzisothiazoline-3-1, 2-benzimidazolone, 4,5,6,7-tetrahydrobenzotriazole, tolylimidazole, 2-(5-ethyl-2-pyridyl) benzimidazole, phthalimide, any alkali metal salts thereof and combinations thereof.

48. The method of claim 46 further comprising at least one additive selected from the group consisting of coloring agents, surfactants, stabilizers, rheological modifiers, opacifying pigments, and any combination thereof.

49. The method of claim 46 wherein said at least one corrosion inhibiting compound is at least one azole and said one azole is present in said corrosion-inhibited fire retardant composition in a minor amount effective to obtain a maximum corrosivity of yellow brass of 5.0 mils per year, as determined by the "Uniform Corrosion" test set forth in Section 4.5.6.1 of "Specification 5100-304b (July 1999) Superseding Specification 5100-00304a (February 1986)," entitled "Specification for Long Term Retardant, Wildland Fire, Aircraft or Ground Application," issued by the United States Department of Agriculture, Forest Service.

50. The method of claim 48 wherein said coloring agents are selected from the group consisting of fugitive coloring agents, non-fugitive coloring agents and pigments, extenders, opacifying pigments, and highly colored pigments.

51. The method of claim 46 wherein said at least one suspending agent is selected from the group consisting of Attapulgus clay, Sepiolite, Fuller's earth, Montmorillonite, and Kaolin clays.

52. The method of claim 46 wherein said corrosion inhibiting system comprises at least one water-soluble corrosion inhibiting compound and at least one water-insoluble corrosion inhibiting compound.

53. The method of claim 46 wherein said corrosion inhibiting system is present in a minor amount effective to reduce the maximum corrosivity of said corrosion-inhibited fire retardant composition to aluminum to 5.0 mils per year, to brass to 5.0 mils per year, and to steel to 5.0 mils per year, as determined by the "Uniform Corrosion" test set forth in Section 4.5.6.1 of "Specification 5100-304b (January 2000) Superseding Specification 5100-00304a (February 1986)," entitled "Specification for Long Term Retardant, Wildland Fire, Aircraft or Ground Application," issued by the United States Department of Agriculture, Forest Service.

54. The method of claim 46 wherein said corrosion-inhibited fire retardant composition comprises from about 0.01% by weight to about 10.0% by weight said corrosion inhibiting system.

55. The method of claim 46 wherein said corrosion-inhibited fire retardant composition comprises from about 0.30% by weight to about 6.0% by weight said corrosion inhibiting system.

56. The method of claim 46 wherein said corrosion-inhibited fire retardant composition comprises from about 0.60% by weight to about 5.0% by weight said corrosion inhibiting system.

57. The method of claim 48 wherein said rheological modifiers are selected from the group consisting of guar gum, derivatized guar gum and xanthan gum.

58. A method of inhibiting corrosion comprising providing a corrodible material and contacting said corrodible material with the corrosion-inhibited fire retardant composition of claim 1.

59. The method of claim 58 wherein said azoles are selected from the group consisting of tolytriazole, benzotriazole, mercaptobenzothiazole, dimercaptomthiadiazole, 1,2 benzisothiazoline-3-1, 2-benzimidazolone, 4,5,6,7-tetrahydrobenzotriazole, tolylimidazole, 2-(5-ethyl-2-pyridyl) benzimidazole, phthalimide, any alkali metal salts thereof and combinations thereof.

60. The method of claim 58 wherein said corrosion-inhibited fire retardant composition comprises at least one water-soluble corrosion inhibiting compound and at least one water-insoluble corrosion inhibiting compound.

61. The method of claim 58 wherein said corrosion-inhibited fire-retardant composition further comprises at least one additive selected from the group consisting of coloring agents, opacifying pigments, surfactants, stabilizers, rheological modifiers, and any combination thereof.

62. The method of claim 58 wherein said corrodible material is selected from the group consisting of steel, brass and aluminum.

63. The method of claim 58 wherein said corrosion-inhibited fire retardant composition further comprises water.

64. The method of claim 58 wherein said at least one suspending agent is selected from the group consisting of Attapulgus clay, Fuller's earth, Montmorillonite, Sepiolite and Kaolin clays.

65. The method of claim 58 wherein said phosphonate is aminotri(methylenephosphonic acid), or a salt thereof.

66. The method of claim 58 wherein said phosphonate is pentasodium aminotri(methylenephosphonic acid).

67. The method of claim 58 wherein said phosphonate is 1-hydroxyethylidene-1,1-diphosphonic acid, or a salt thereof.

68. The method of claim 58 wherein said phosphonate is tetrasodium 1-hydroxyethylidene-1,1-diphosphonic acid.

69. The method of claim 58 wherein said phosphonate is hexamethylenediaminetetra(methylenephosphonic acid), or a salt thereof.

70. The method of claim 58 wherein said phosphonate is hexapotassium hexamethylenediaminetetra(methylenephosphonic acid).

71. The method of claim 58 wherein said phosphonate is diethylenetriaminepenta(methylenephosphonic acid), or a salt thereof.

72. The method of claim 58 wherein said phosphonate is hexasodium diethylenetriaminepenta(methylenephosphonic acid).

73. The method of claim 58 wherein at least one phosphonate comprises less than about 10% by weight of said composition, based on total ammonium polyphosphate composition.

74. The method of claim 58 wherein the phosphonate makes up in the range of about 1% to about 10% by weight of said corrosion-inhibited fire retardant composition.

75. The method of claim 58 wherein the phosphonate makes up about 4.35% by weight of said corrosion-inhibited fire retardant composition.

76. The method of claim 61 wherein said rheological modifiers are selected from the group consisting of guar gum, derivatized guar gum and xanthan gum.

77. The method of claim 61 wherein said coloring agents are selected from the group consisting of fugitive coloring agents, non-fugitive coloring agents and pigments, extenders, opacifying pigments, and highly colored pigments.

78. A corrosion-inhibited agricultural plant nutrient composition comprising:
- at least one agricultural plant nutrient;
- at least one suspending agent;
- at least one phosphonate selected from a group consisting of aminotri(methylenephosphonic acid), 1-hydroxyethylidene-1,1-diphosphonic acid, hexamethylenediaminetetra(methylenephosphonic acid), diethylenetriaminepenta(methylenephosphonic acid), salts thereof, and mixtures thereof; and
- a corrosion inhibiting system comprising at least one corrosion inhibiting compound selected from the group consisting of azoles, ferric pyrophosphate, ferrous oxalate, ferric citrate, ferrous sulfate, ferric ammonium citrate, ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxalate, ferrous oxide, ferric lactate, ferric resinate and any combination thereof;

wherein said corrosion inhibiting system is present in a minor amount effective to substantially reduce corrosiveness of said agricultural plant nutrient composition.

* * * * *